May 23, 1967 R. B. BONNEY ETAL 3,321,609

COMPUTER LANGUAGE TRANSLATOR

Filed Dec. 5, 1958 17 Sheets-Sheet 1

FIG. I.

*INVENTORS*
ROBERT B. BONNEY
CHARLES R. SUBLETT

BY Harry R. Lubcke
AGENT

INVENTORS
ROBERT B. BONNEY
CHARLES R. SUBLETT
BY Harry R. Lubcke
AGENT

May 23, 1967 R. B. BONNEY ETAL 3,321,609

COMPUTER LANGUAGE TRANSLATOR

Filed Dec. 5, 1958 17 Sheets-Sheet 3

INVENTORS
ROBERT B. BONNEY
CHARLES R. SUBLETT

BY Harry R. Lubcke

AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

May 23, 1967 R. B. BONNEY ET AL 3,321,609

COMPUTER LANGUAGE TRANSLATOR

Filed Dec. 5, 1958 17 Sheets-Sheet 7

INVENTORS
ROBERT B. BONNEY
CHARLES R. SUBLETT
BY Harry R. Lubcke
AGENT

May 23, 1967 R. B. BONNEY ET AL 3,321,609

COMPUTER LANGUAGE TRANSLATOR

Filed Dec. 5, 1958 17 Sheets-Sheet 8

INVENTORS
ROBERT B. BONNEY
CHARLES R. SUBLETT
BY Harry R. Lubcke
AGENT

INVENTORS
ROBERT B. BONNEY
CHARLES R. SUBLETT
BY
Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY Harry R. Lubcke
AGENT

INVENTORS
ROBERT B. BONNEY
CHARLES R. SUBLETT
BY *Harry R. Lubcke*
AGENT

INVENTORS
ROBERT B. BONNEY
CHARLES R. SUBLETT
BY Harry R. Lubcke
AGENT 3,321,609

COMPUTER LANGUAGE TRANSLATOR

Robert B. Bonney and Charles R. Sublett, Tustin, Calif., assignors to Electronic Engineering Co. of California, Santa Ana, Calif., a corporation of California
Filed Dec. 5, 1958, Ser. No. 778,396
5 Claims. (Cl. 235—154)

Our invention relates to data processing and particularly to a relatively universal means for translating digital data from one format to another in order that the format requirements of a desired electronic computer may be met.

With the growth of the electronic computer industry has come a disturbing increase in the number of formats according to which data are processed. Unless data are presented to a particular electronic computer in the exact format intenedd for use in that computer the computer will not operate upon the data.

Obviously, a device for formatizing original or "raw" data and for changing the format of data prepared for or derived from one type of electronic computer to the format for another type of computer is needed. Thus far, these needs have been recognized with respect to particular formatizing or translational jobs. Format control buffers, as these may be called, have been built for a particular job and they are useful in performing that job. However, such devices are invariably impotent for performing another formatizing or translational job and so the user of computers has been faced with acquiring a relatively large number of such buffers or else remain impotent to process certain data formats.

The need for a universal computer language translator has not gone unfilled because those skilled in the art have not been aware of the need for such a device, but because a way of supplying this need has been obscure.

Having been repeatedly faced with this problem we began to see a pattern of functions required for nearly all translational work and for accomplishing such work we evolved a correlated grouping of particular apparatus having relatively universal application. This particular grouping we have called a "universal format control." To this we added an input control and read electronics for reproducing the initial data in the form of electrical pulses for format translation by the universal format control entity. We also added an output control and write electronics which took the translated electrical pulses and arranged for recording the same on a desired medium. Incidental to the input control are such items of apparatus as card readers, tape units, punched paper tape readers, analog to digital converters, electric typewriters and manual keyboards. Incidental to the output control are such items of apparatus as tape units, card punches, paper tape punches, line printers and/or plotters.

Accordingly, assuming any computer center having certain of the incidental items of apparatus, a translational center is established by installing the basic universal format control unit and such input control and output control units as required to handle the great majority of work carried on, or capable of being carried on, by the particular computer center. When this is done we achieve a very greatly increased capability of translation with less apparatus than is the case where relatively individual format control buffers of the prior art are constructed and employed.

Briefly describing our invention, initial data are impressed upon the system by electrical reproduction from a magnetic tape reproducer, punched card reader, analog to digital converter, telemetered test information, etc., etc. An input control unit and read electronics entity suited to the specific type or the general class of input apparatus involved is provided. This is interconnected to the data source and to the central "universal format control." The input united apparatus has an input data register for handling digital data over seven parallel channels, for example. It also controls largely ministerial functions, such as start, stop, end of data recognition, data clock, end of block, end of file, end of tape, rewind, error, etc.

The central universal format control has a static memory as an important component. In addition there are controls and circuits auxiliary to the memory, parity check circuits, special character recognition circuits, special character generators, preset block counters, a preset file counter, a clock generator, a parity generator, a word length counter, block length counter, a patchboard and a control panel. A word converter and/or a character converter are auxiliaries to this format control for the purpose of rearranging digital data comprising words and characters.

The output of our translator is formulated under the control of and by means of an ouput control and write electronics entity. This includes an output register, unload cycle control circuit, word converter control circuit, a ring counter, special character generator and detector, an error detector, and other devices and elements of ministerial character.

In use, the translator is set up to accept and reproduce data according to the format in which it occurs, the format desired is arranged by suitable connection of the universal format control assisted by suitable use of the patchboard mentioned, and output writing provided for by setting up the physical apparatus to handle the desired medium and by providing appropriate output control instrumentalities.

An object of our invention is to provide a means for translating any of plural formats of data from one to another with minimum apparatus.

Another object is to rearrange the characters in a digital word in order to change from one format to another.

Another object is to rearrange the data bits in a character in order to change from one format to another.

Another object is to recognize, generate or delete special character bits or parity bits in format translation.

Another object is to unitize apparatus for format translation such that the flexibility of such apparatus for that purpose is a maximum.

Other objects will become apparent upon reading the following detailed specification and upon examining the accompanying drawings, in which are set forth by way of illustration and example certain embodiments of our invention.

Figure 3:
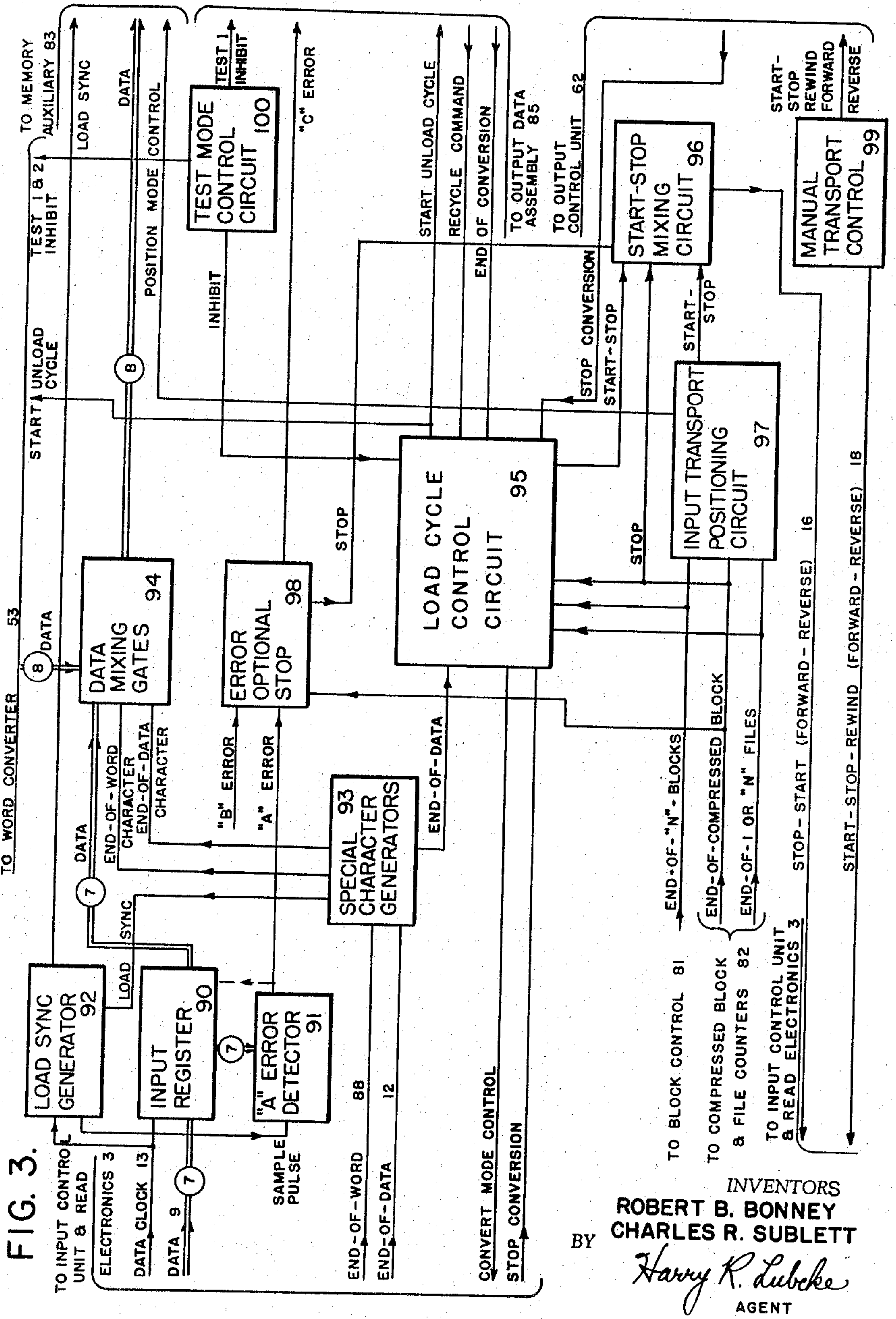
Figure 4:
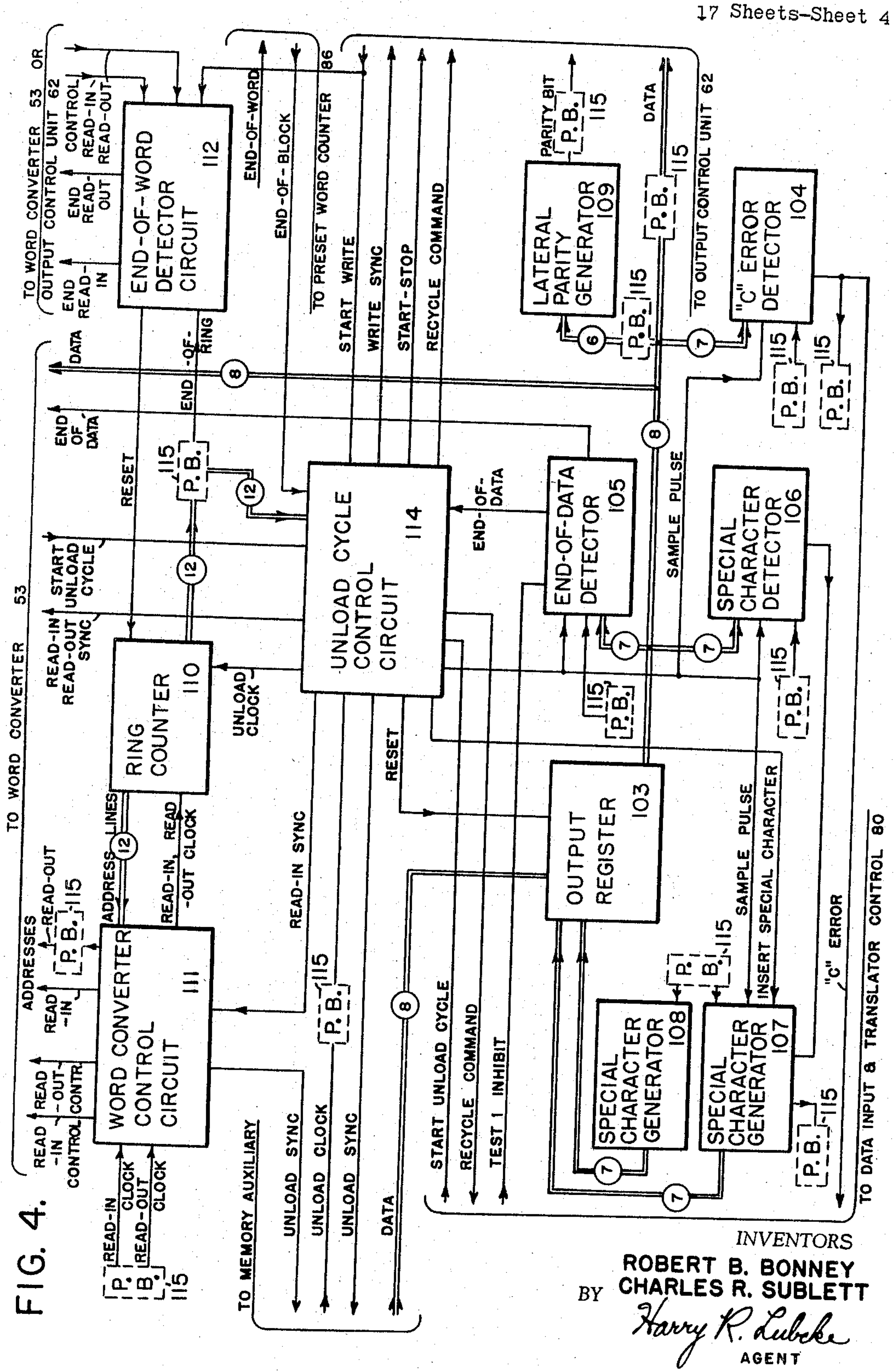
Figure 5:
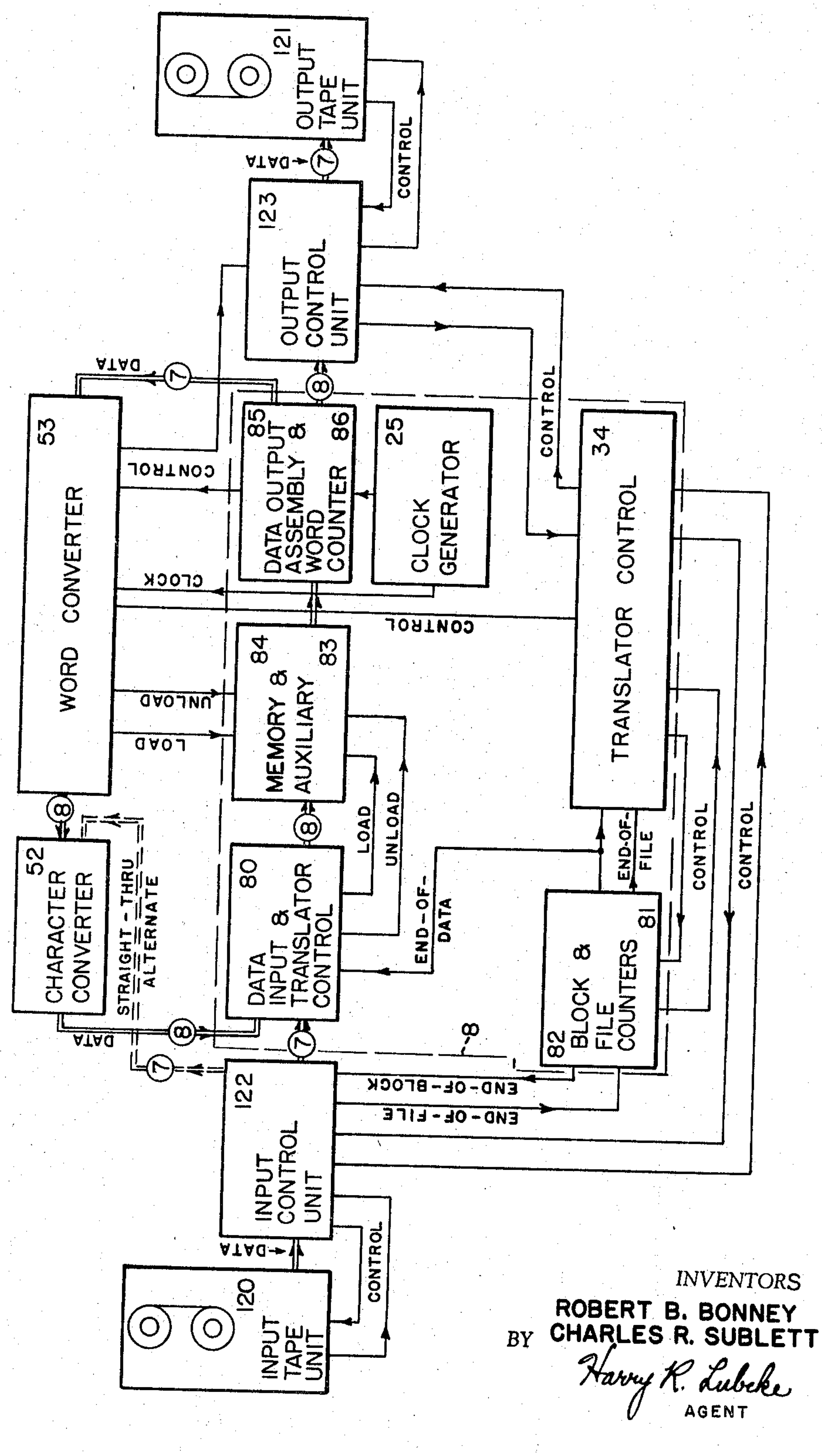
Figure 6:
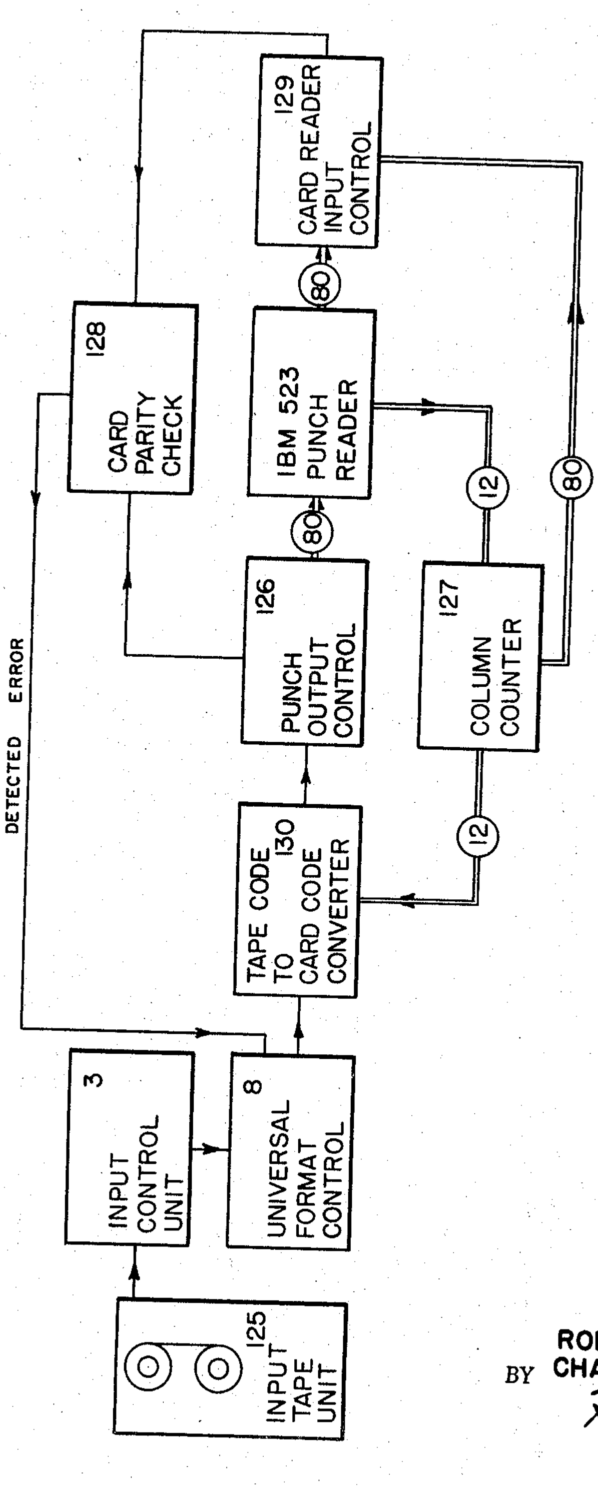
Figure 7:
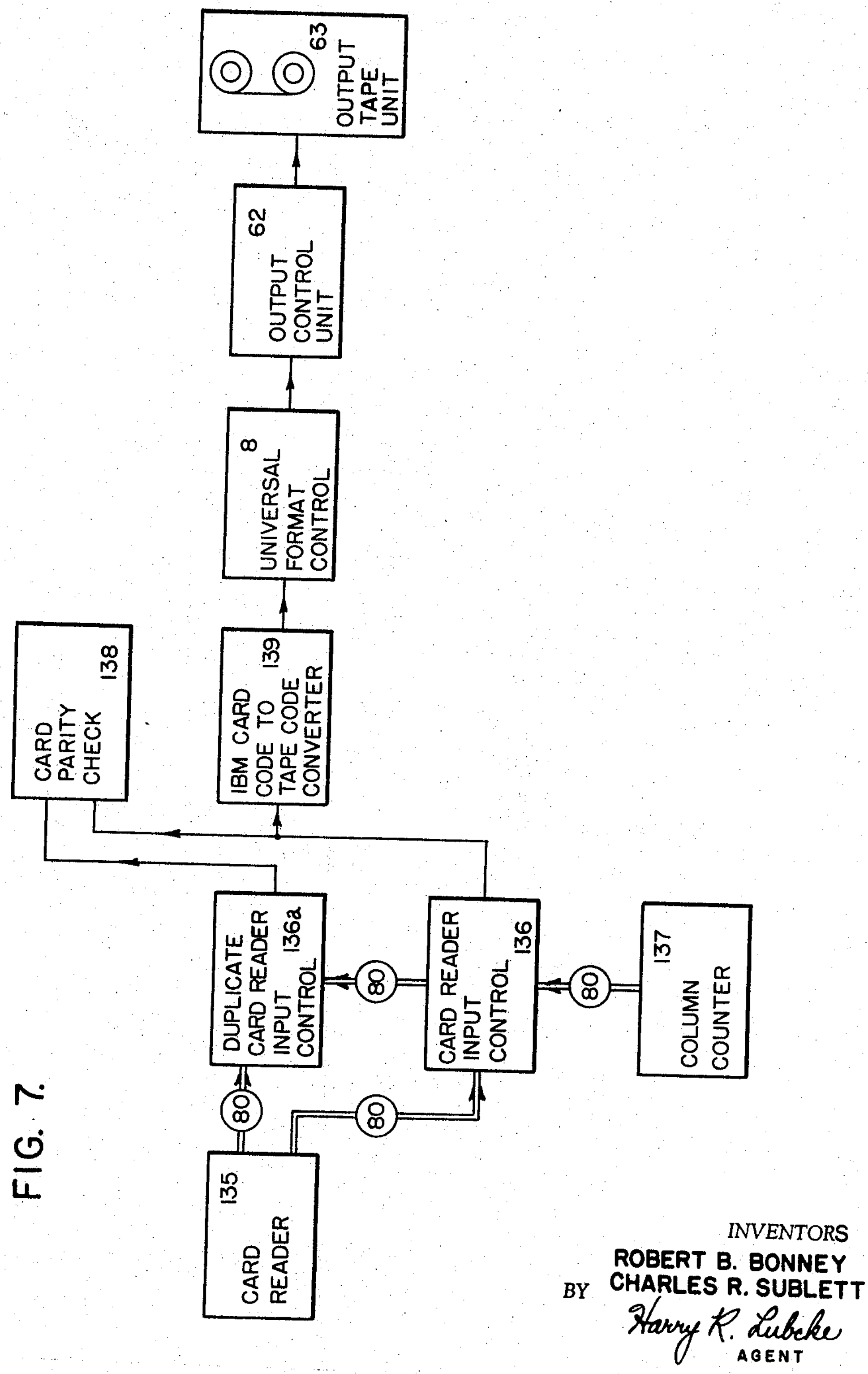

FIG. 3 shows a diagram of the data input and translator control of the above universal format control, FIG. 4 shows a diagram of the data output assembly of the above universal format control, FIG. 5 shows a diagram of our translator arranged to change the format of data on magnetic tape and to record the same on other tape, FIG. 6 shows our translator arranged to change the format of data from magnetic tape and record the same on punched cards, FIG. 7 shows our translator arranged to change the format of data from punched cards and record the same on magnetic tape.

Figure 1:
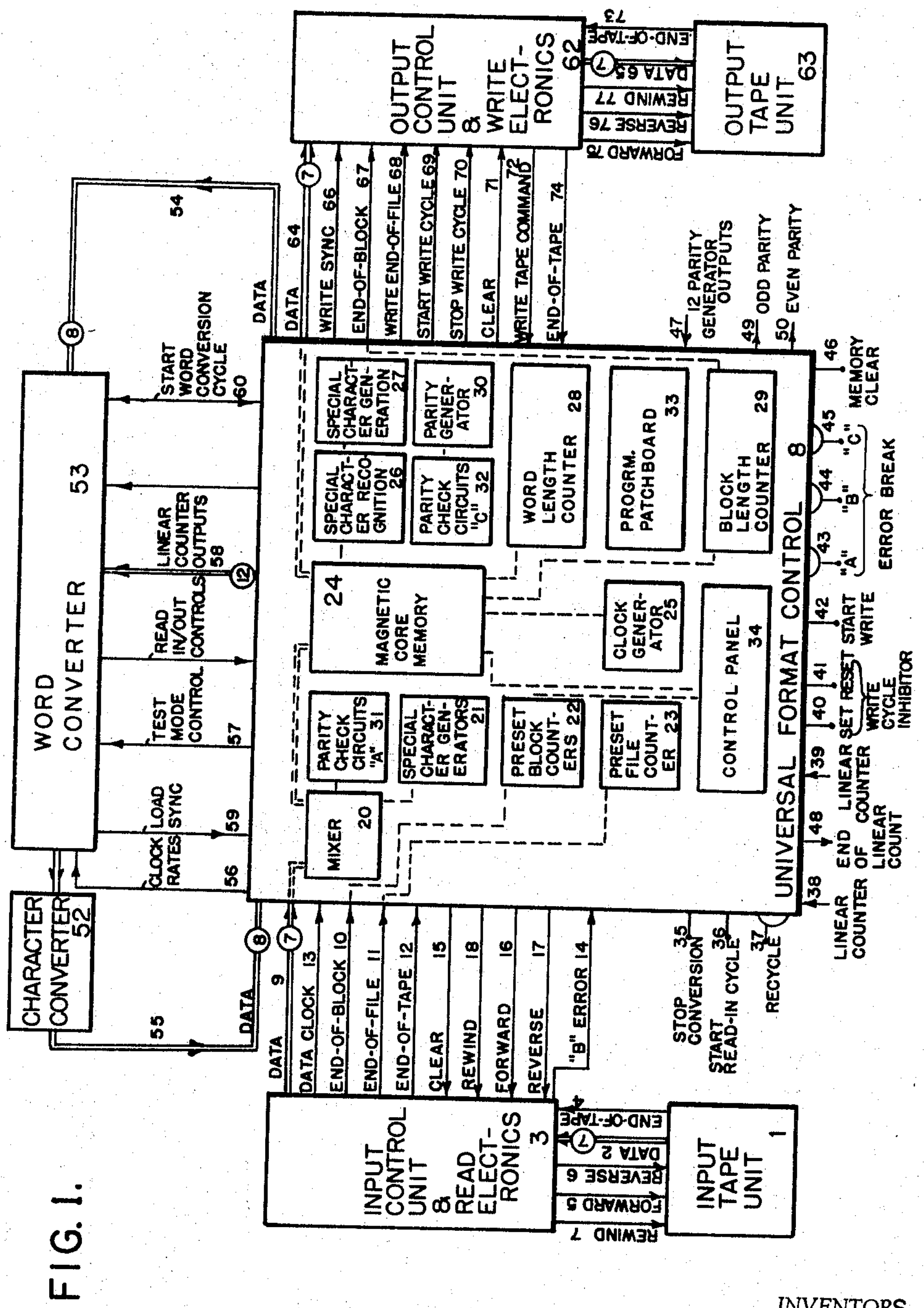
FIG. 1 shows the general block diagram of our translator.

FIG. 1 shows our whole computer language translator arranged to take digital information from a magnetic tape source, to change the format of that information, and to record the translated information on another magnetic tape. It is a schematic figure in that the electrical connections within the central universal format control are illustrated by dotted lines. Such connections are uniquely determined for any set of specific conditions by pre-wired program patchboards, the suitable one of which is merely plugged into the patchboard jack bay and by possibly making other circuit connections between the apparatus elements.

It will be recognized that the interconnecting wires shown in the figures of the drawings represent one typical set of connections to and from the patchboard jack bay through a pre-wired program board.

In FIG. 1 numeral 1 indicates the input tape unit. This is a known IBM 727 or equivalent computer magnetic tape device. From this, digital data passes over seven parallel path conductors collectively labelled 2 to input control unit and read electronics entity 3. An end of tape signal also arises from tape unit 1 and is conveyed to input entity 3 over conductor 4. Control of forward tape transport motion arises in input entity 3 and goes to unit 1 over conductor 5, as does the control of reverse motion over conductor 6 and rewind tape over conductor 7.

After passing through an input register and auxiliary devices the data pass to the central universal format control 8 over seven conductors 9. In a similar manner, end-of-block information passes from input entity 3 to control 8 over conductor 10, end-of-file information over conductor 11, end-of-tape information over conductor 12, data clock information over conductor 13, and "B" error information over conductor 14.

Commands to clear the input entity register pass from control 8 to input entity 3 over conductor 15, to transport forward 16, to reverse over 17 and to rewind over 18.

Within the universal format control 8 are various apparatus elements selected and composed for universality of application, such as mixer 20 having data mixing gates, plural special character generators 21, preset block counters 22, a preset file counter 23, a magnetic core memory 24, a clock generator 25, special character recognition circuits 26, special character generation circuits 27, a word length counter 28, a block length counter 29, a parity generator 30, "A" parity check circuits 31, "C" parity check circuits 32, a program patchboard 33 and a control panel 34.

IBM and certain other computer tapes are organized on the basis of files, where a file may be a complete report, listing, or other group of associated data. The preset file counter keeps track of the number of files that have been processed by the translator. This is a preset counter which can be preset to process any desired number of files by the translator.

Special characters are used by various computers for control processes. Typical characters are end-of-word, end-of-block, end-of-file and blank. The number of special characters and their definition varies from computer to computer.

Data on computer magnetic tapes are ordinarily written in blocks with a length of blank tape interspersed between blocks. This is to allow a blank area for starting or stopping the tape. In our translator, the block length counter normally operates during the writing cycle and keeps track of the number of characters which have been written onto the output tape. When the end of the block has been reached, the block length counter delivers a control signal to stop the output tape unit.

Certain typical internal connections between these elements are indicated by dotted lines within the central control 8. These are not complete but are illustrative, particularly as to program patchboard 33 and control panel 34, since connections from these elements pass to substantially every other unit.

Other controls, initially entering particularly the control panel, are the stop conversion control 35, start read-in cycle 36, recycle 37, linear counter inputs 38, linear counter reset 39, the write cycle inhibitor set 40 and reset 41, start write cycle 42, error break "A" 43, error break "B" 44 and error break "C" 45, memory clear control 46, and 12 parity generator inputs 47. Other outputs from central control 8 are end of linear count 48, odd parity 49, and even parity 50.

The linear counter is a general purpose counter, which we have also referred to as a ring counter 110 in FIG. 4. There are as many counter elements as the full-scale count capacity. In the embodiment of FIG. 4 this is a twelve stage counter employing twelve flip-flops as is evidenced by the "12 address lines" emerging from counter 110. With the counter reset, each input advances the count from one flip-flop to the next, as is understood from first principles. The output from the counter stages, via the connections shown, is used to turn other equipment on and off and to otherwise control and time the operation of various parts of the system. A typical use is to generate output words having a fixed number of characters. In this case the linear counter determines the number of characters that are read out of the memory. However, our counter has been constituted to operate in several different modes, in application, depending upon the logic of the connections to and from the counter. This allows it to be used for several different functions during the translation operation. Note the connection of 12 lines to the patchboard "P.B. 115."

In certain conversions, such as IBM 705 tapes to Univac I tapes, rearrangement of a character or content of a word is required. For this, character converter 52 and/or word converter 53 are required. These entities normally function with recirculation of the information through memory 24. To accomplish this eight parallel digital data lines pass out of and return to the control 8 via conductors 54 and 55, respectively. Other coacting controls pass between these entities, such as clock rates via conductor 56 from control 8 to word converter 53, test mode control 57, and twelve linear counter outputs 58, similarly. From word converter 53 to control 8 goes load synchronization via conductor 59. The start word conversion cycle requires at least one conductor 60 in each direction.

In a manner similar to input entity 3, output control unit and write electronics 62 is connected to control 8 and to an output tape unit 63. The digital data pass from the control to entity 62 by means of seven conductors 64 and on to tape unit 63 by seven conductors 65. From control 8 to entity 62 there also proceeds write synchronization information via conductor 66, end-of-block information via conductor 67, write end-of-file information via conductor 68, start write cycle information via conductor 69, stop write cycle information via conductor 70, and clear the output entity information via conductor 71. From the output entity 62 arises the write tape command which passes to control 8 via conductor 72. End-of-tape information originates at output tape unit 63 and is conveyed from there to output entity 62 via conductor 73 and therefrom to control 8 via conductor 74. Forward, reverse and rewind commands from output entity 62 reach the output tape unit 63 via conductors 75, 76, 77, respectively.

In reading magnetic tapes into our translator, an end-of-block signal is detected when the end of a particular block of data is received. The signal generated by the end of the block is entered into our translator for control purposes. In writing output tapes an end-of-block command is delivered to the output tape unit when the end of a block of data is reached. This end of block signal is used to control the output tape unit.

Write end-of-file is an operational command used in writing output tapes. The initiation of this command causes a unique end-of-file pattern to be written onto the output tape. In some cases the end-of-file is an extra long inter-block blank space. In others, it is a specific code symbol. At times a combination of both of these indicia are employed.

Figure 2:
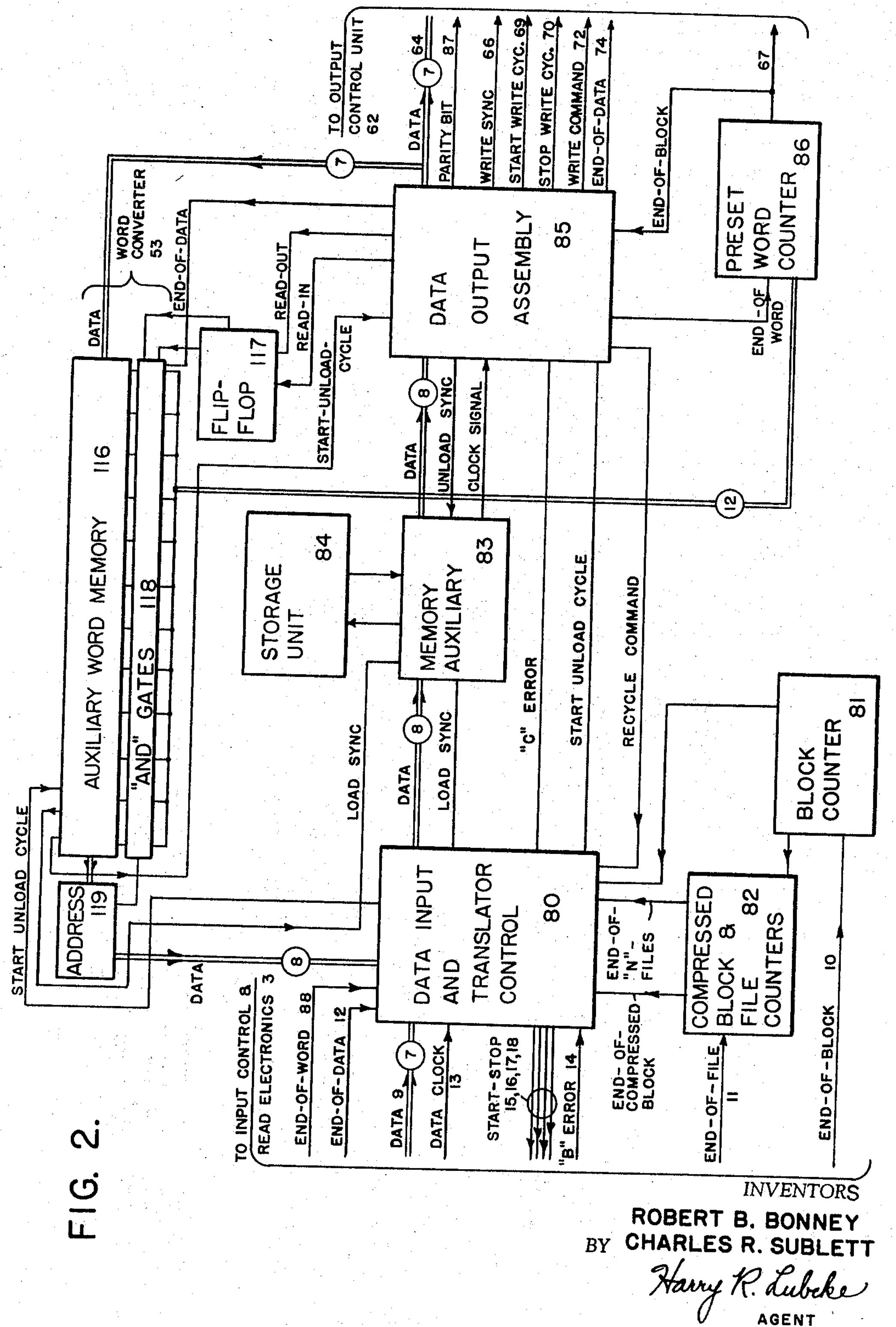
FIG. 2 shows a diagram of the central universal format control thereof.

In FIG. 2 the elements of universal format control 8 are grouped in functional order. This order sets the pattern for still further detail of this control in succeeding figures.

In FIG. 2 all the input conductors 9 through 18 of FIG. 1, save 10 and 11, enter a data input and translator control entity 80. The contents thereof is detailed in FIG. 3 to follow. The end-of-block information, conductor 10, enters block counter 81 in FIG. 2. An output at the end of each block passes from element 81 to the compressed block and file counters entity 82. An output at the end of "N" blocks passes from element 81 to entity 80. The end-of-file information, conductor 11, enters compressed block and file counters 82 and therefrom goes end-of-compressed-block information and separately end-of-"N"-files information to data input and translator control 80.

The term "end of 'N' blocks" refers to a control signal which occurs when a preset number (that is, a selected number "N") of data blocks have been entered into the translator system. This signal is generated by counter 22 in FIG. 1.

The term "end-of-'N'-files" refers to a control signal which occurs when a preset number (i.e., "N") of files have been entered into the translator system. This signal is generated by counter 23 in FIG. 1.

From entity 80 goes digital data over eight parallel conductors to memory auxiliary 83. Another conductor also passes load synchronization from entity 80 to auxiliary 83. Data and control information goes to and returns from memory storage unit 84 from auxiliary 83. The memory storage unit may have a capacity of 1092 or 2184 characters, for example, depending upon the requirements of usual applications. The larger memory is preferred when the group of data characters to be stored is large.

From auxiliary 83 previously stored digital data go over 8 conductors to data output assembly 85, which assembly is detailed in FIG. 4 to follow. A clock signal also goes from auxiliary 83 to output assembly 85, and a start unload cycle command from input control 80 to output assembly 85. From output assembly 85 goes a recycle command to input control 80, also "C" error information, and unload synchronization from 85 to auxiliary 83. Also from output assembly goes end-of-word information to preset word counter 86 and end-of-block information from that counter returns to output assembly 85.

From output asembly 85 go most of the data to the output control and write electronics 62 of FIG. 1. This includes digital data over seven parallel conductors 64, write synchronization via 66, start write cycle via 69, stop write cycle via 70 and parity bit information via conductor 87. End-of-block information passes from preset word counter 86 to entity 62 via conductor 67. From entity 62 comes write command information to output assmbly 85 via conductor 72 and also end-of-data information via conductor 74.

Where word conversion is required the digital data are recirculated through memory auxiliary 83 and storage 84 in the following manner. From data output at 64 of the data output assembly 85 a duplicate seven conductor group takes the digital information to word converter 53. Also from output assembly 85 goes end-of-data, read-in, read-out and address controls. From word converter 53 start unload cycle information comes to output assembly 85. Also from word converter 53 comes load synchronization to memory auxiliary 83 and also therefrom to data input translator control 80 digital data over 8 parallel conductors. From entity 80 to word converter 53 goes start unload cycle information.

The detailed composition of each of the block elements is now given.

Block counter 81, FIG. 2, is composed of four preset decade-counter plug-in units and a block control plug-in unit. Each such counter unit may be a type Y–102 flip-flop described with schematic circuit in Catalog 856 (published in Aug. 1956) of the Engineered Electronics Co., 1441 E. Chestnut Ave., Santa Ana, Calif. These counter units may be connected according to the FIGS. 3–4, page 18, of the reference book, "High-Speed Computing Devices," first edition, edited by W. W. Stifler, Jr. (ERA), McGraw-Hill Book Company, Inc., New York, 1950. The labelled "Input" connection of the device of FIGS. 3–4 in the book connects to wire 10 of FIG. 2 of these drawings and the "Output" to adjacent blocks 80 and 82 via the wires with arrows shown in FIG. 2 of these drawings. The block counter counts the end-of-block pulses from input control unit 3, FIG. 1, (via wire 10, FIG. 2) when the input transport is operating in either the forward or the reverse direction. The end-of-block pulses are gated by the forward-reverse control signals from data input and translator control 80 by "and" gates located in the block counter control unit. These may be the Y–417 type described in the above-referenced Catalog 856 and constitute the block counter control unit. The end-of-block pulses are then applied to the units decade of a thousands, hundreds, tens, units preset counter.

Each of these counter units contains a decade counter tube, a switch for selecting the desired preset count and two one-shots which trigger the decade counter tube. When counting in the forward direction, the gated end-of-block pulses from the block counter control trigger a one-shot. The resulting positive pulse is inverted by a driver which applies a negative pulse to the counter tube. After 20 microseconds the first one-shot triggers the second one-shot and the counter tube is triggered. Two stepping signals applied to the counter tube result in shifting conduction to the next cathode in sequence. When counting in the reverse direction the second one-shot is triggered by the end-of-block pulses and the counting action is reversed.

When all the counter stages produce count out signals; i.e., when the preset count is accumulated, the block control delivers a negative pulse to data input and control 80 and this represents the end-of-"N"-blocks of input data.

A block counter reset signal is received from entity 80 when a corresponding manual push-button is depressed. Thereafter the second one-shot inhibits an output gate for a number of milliseconds to prevent transient outputs.

The compressed block and file counters 82 contains two separate counter units; the compressed block counter and the file counter. Each counter is composed of two preset decade-counter plug-in units and related control circuits. Both counters operate in a manner similar to that described for block counter 81 and contain the same elements.

The compressed block and file counters are of the preset type and are used to allow a selected number of input blocks or files to be compressed and written out as a single long block or file. As an example, the compressed block counter can be used to accept input magnetic tapes written in card-size blocks of 80 characters and to produce an output block of 960 characters by combining the data from 12 input cards into a single block.

The file counter operates in either the forward or the reverse direction. It counts the end-of-file pulses applied from input control unit 3 via conductor 11. Two decade counter units are preset to respective units and tens digits for the desired number of files to be processed.

The compressed block counter operates in the forward direction only. The end-of-block pulses are introduced from the block counter 81 via the connection between blocks 81 and 82 shown in FIG. 2, and thus are present only when the input transport is operating in the forward direction. The compressed block counter differs from the other counters in that it is self-resetting. When the preset count of input blocks is accumulated the resulting counter output triggers a one-shot. From the latter a compressed block count out is delivered to the data input entity 80 while another output from the one-shot provides the automatic reset pulse.

The one-shot may be the Y-104 type described in Catalog 856. From the circuit operation predicated, the "output" connection of the device of FIGS. 3–4 previously identified connects to the input terminal of the one-shot and an output terminal of the one-shot connects to the external wire labelled "end-of-compressed-block" in FIG. 2.

Continuing the description of the details of each block of apparatus, this information for the data input and translator control 80 of FIG. 2 is given with reference to FIG. 3, which illustrates that detail.

In FIG. 3 digital data incoming over seven conductors 9 pass directly to input register 90, as does data clock information via conductor 13. The input register consists of seven flip-flops, each having an "and" gate. Each of the flip-flops and its "and" gate is uniquely provided according to the schematic circuit for the type Y–102 flip-flop described in Catalog 856. The connection of *n* such flip-flops is set forth in "High-Speed Computing Devices," page 295 and in FIGS. 13–24 therein, which figure has flip-flops "FF1, FF2, etc." The input data characters from conductors 9 are gated into the input register by the data clock signals from conductor 13. Both outputs of the input register are applied to "A" error detector 91 and to seven single-pole double-throw switches within the input register device 90. These switches allow either a "standard" output from one side of the flip-flops or a "complement" output from the other side. The input register is reset by a reset pulse from the memory auxiliary 83, which occurs a few microseconds after each load synchronization pulse.

"A" error detector 91 is composed of an "and" logic connected to each flip-flop or input register 90, subsequent "or" logics, and "not" circuits, as well as an input lateral parity switch. If the parity bit in the seventh flip-flop is correct a zero signal is generated. If the parity bit is incorrect a binary "1" output instead is produced. With the aid of a sample pulse from load sync generator 92 the error signal is gated out and passes to an error optional stop circuit.

The "A" error detector is one of three error control circuits which can be connected to operate in conjunction with error detection circuits in various parts of our translator. The "A" error circuit is normally connected to operate from error detection circuits associated with input devices and is shown so connected with the "(7)" data lines to input register 90 in FIG. 3.

Figure 8:
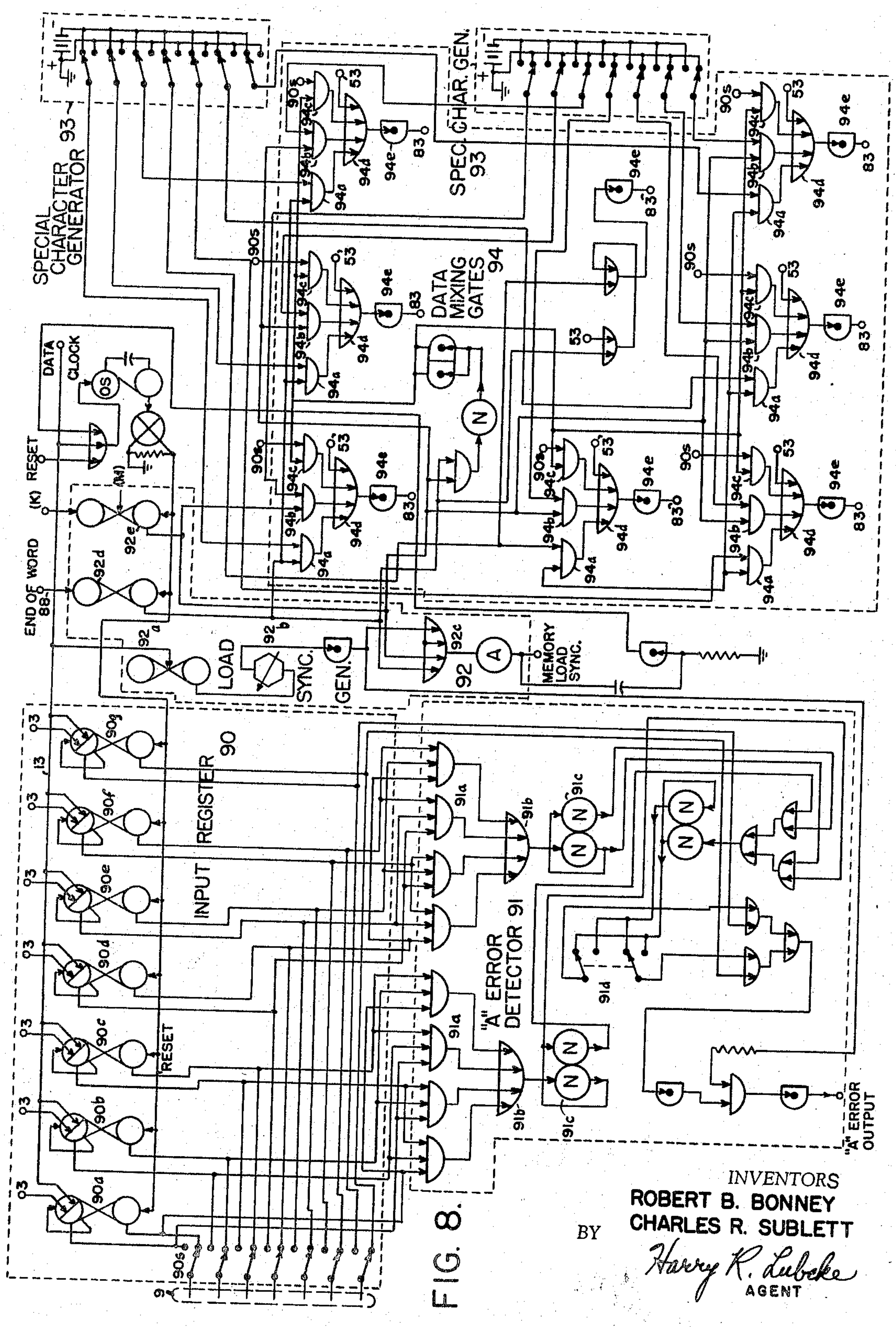
Figure 9:
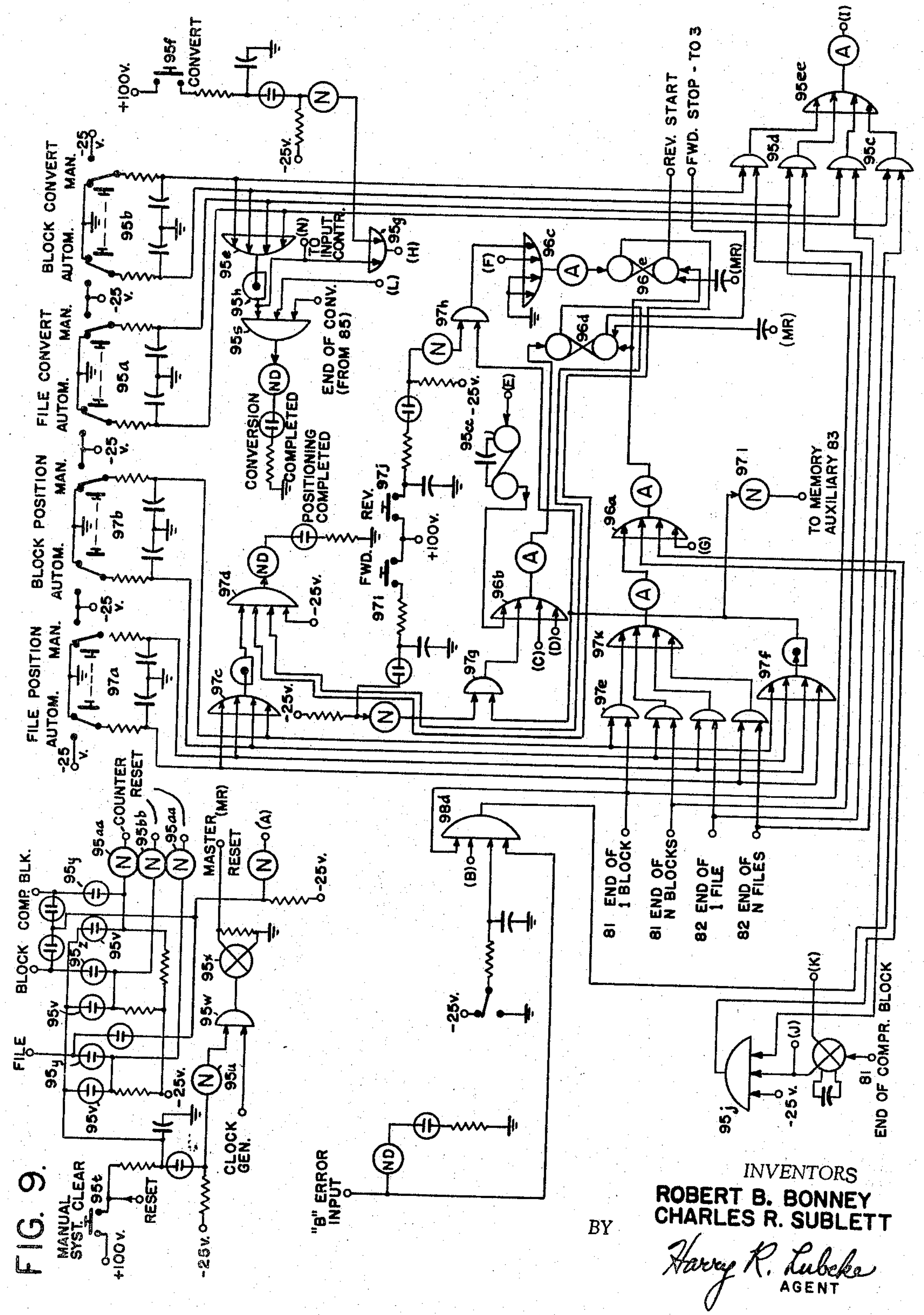
Figure 10:
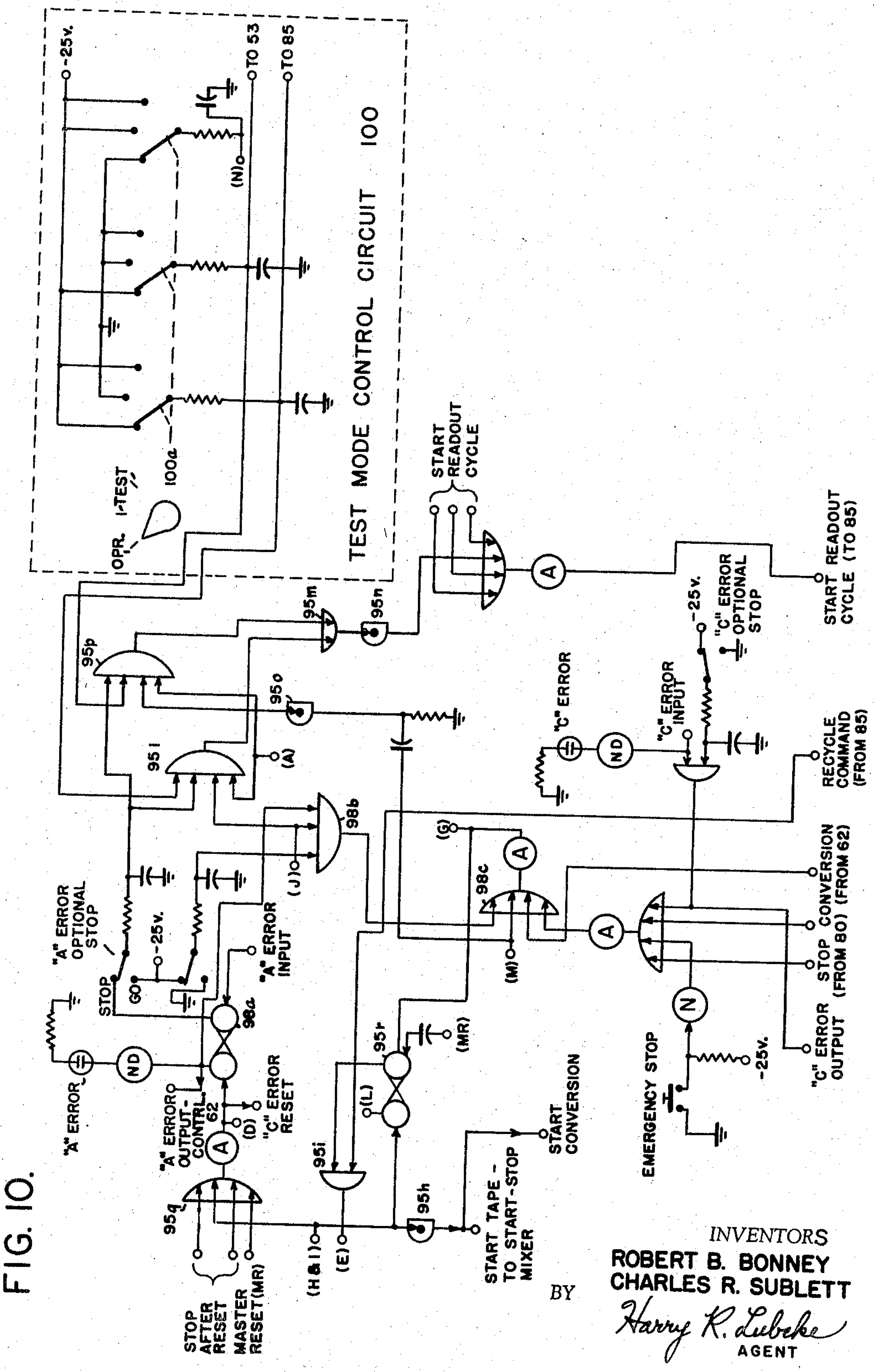
Figure 11:
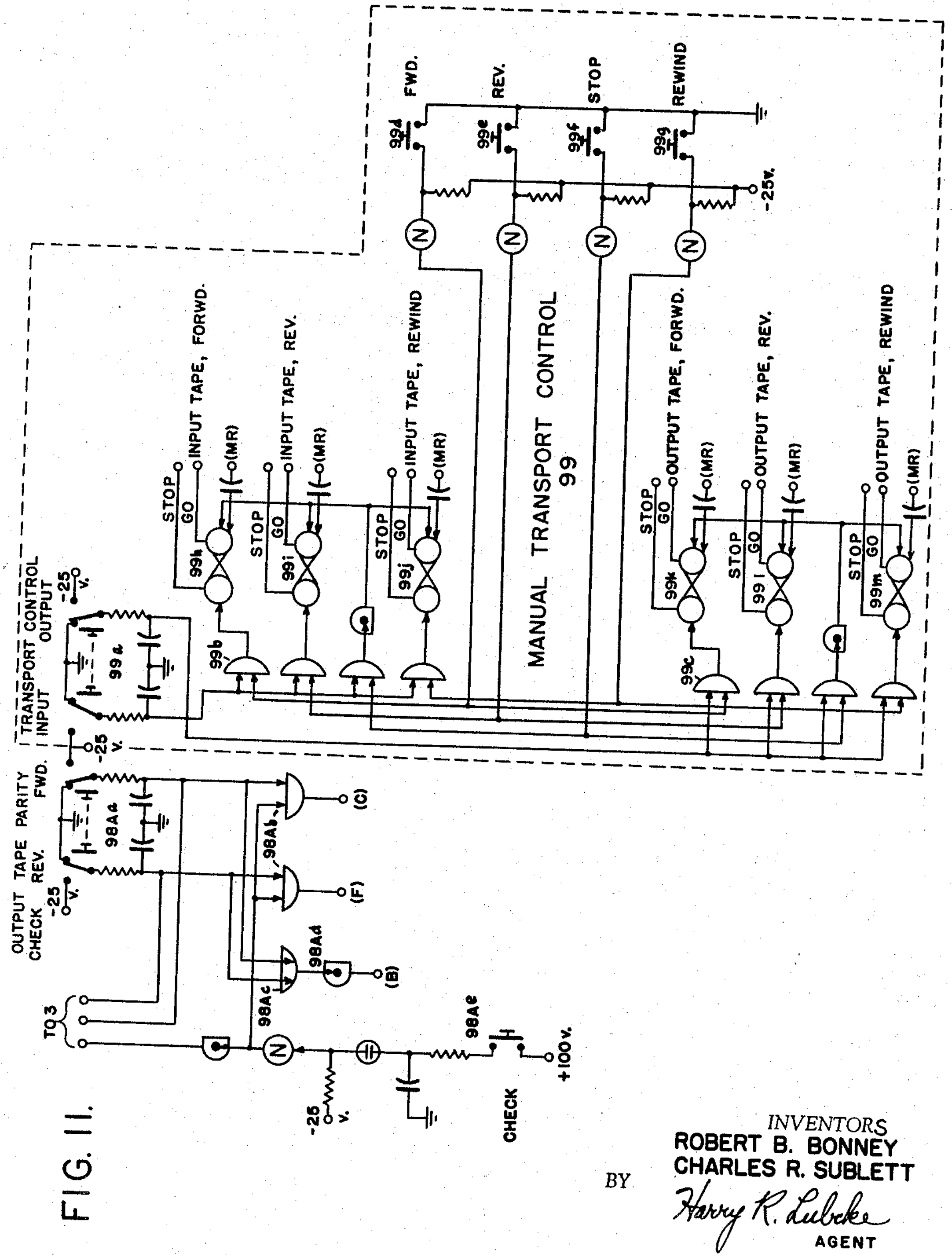
Figure 12:
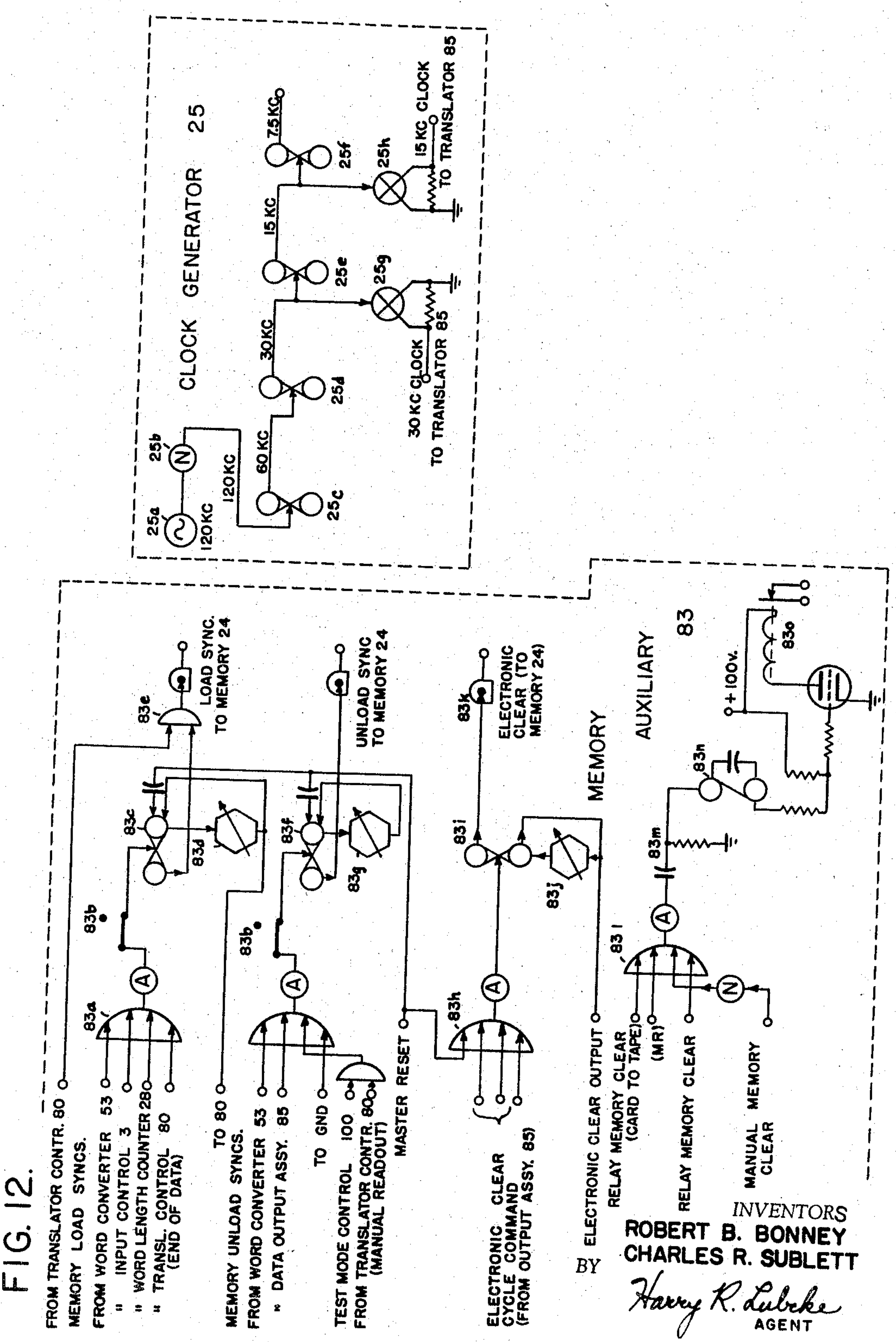
Figure 13:
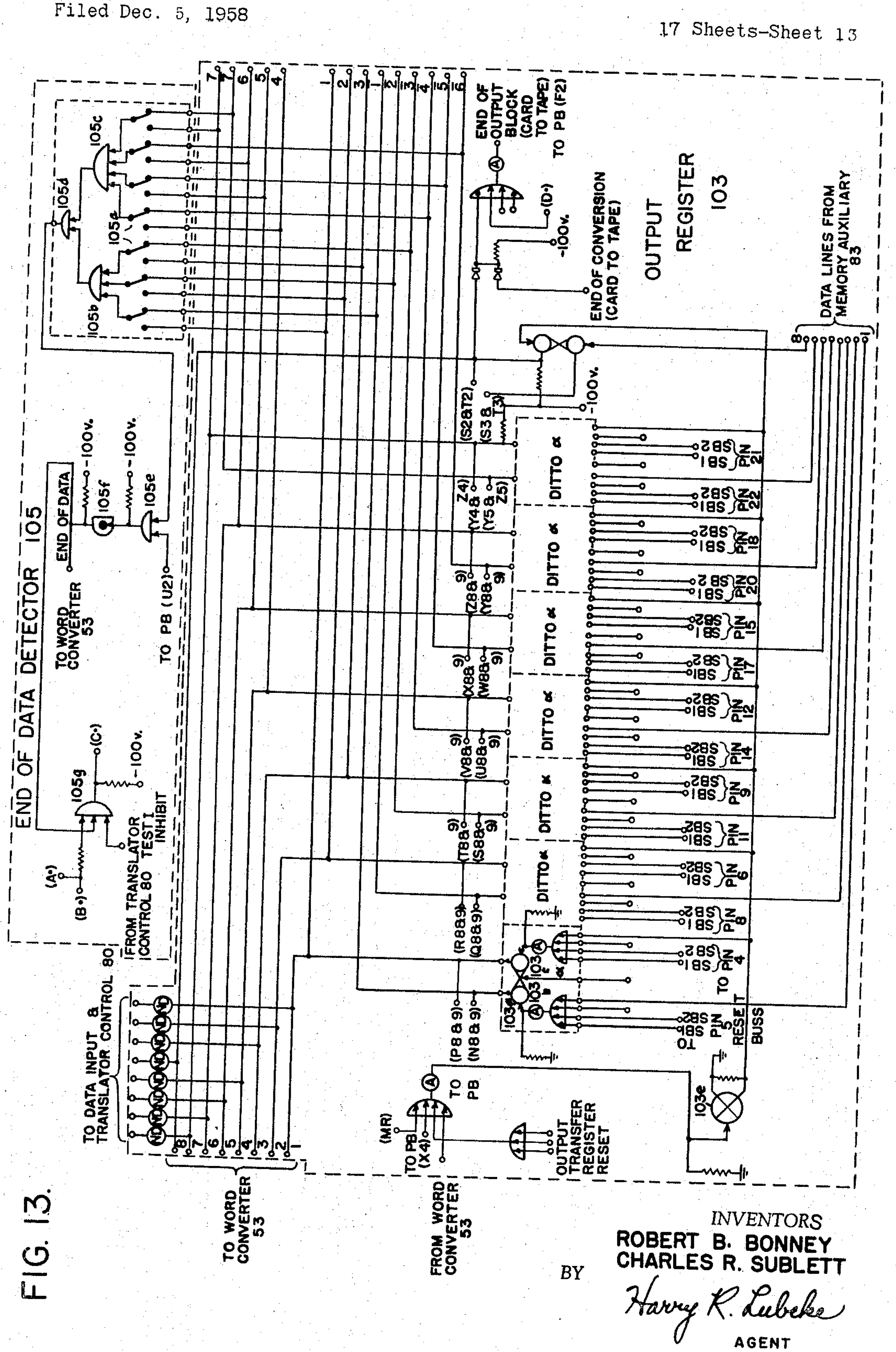
Figure 14:
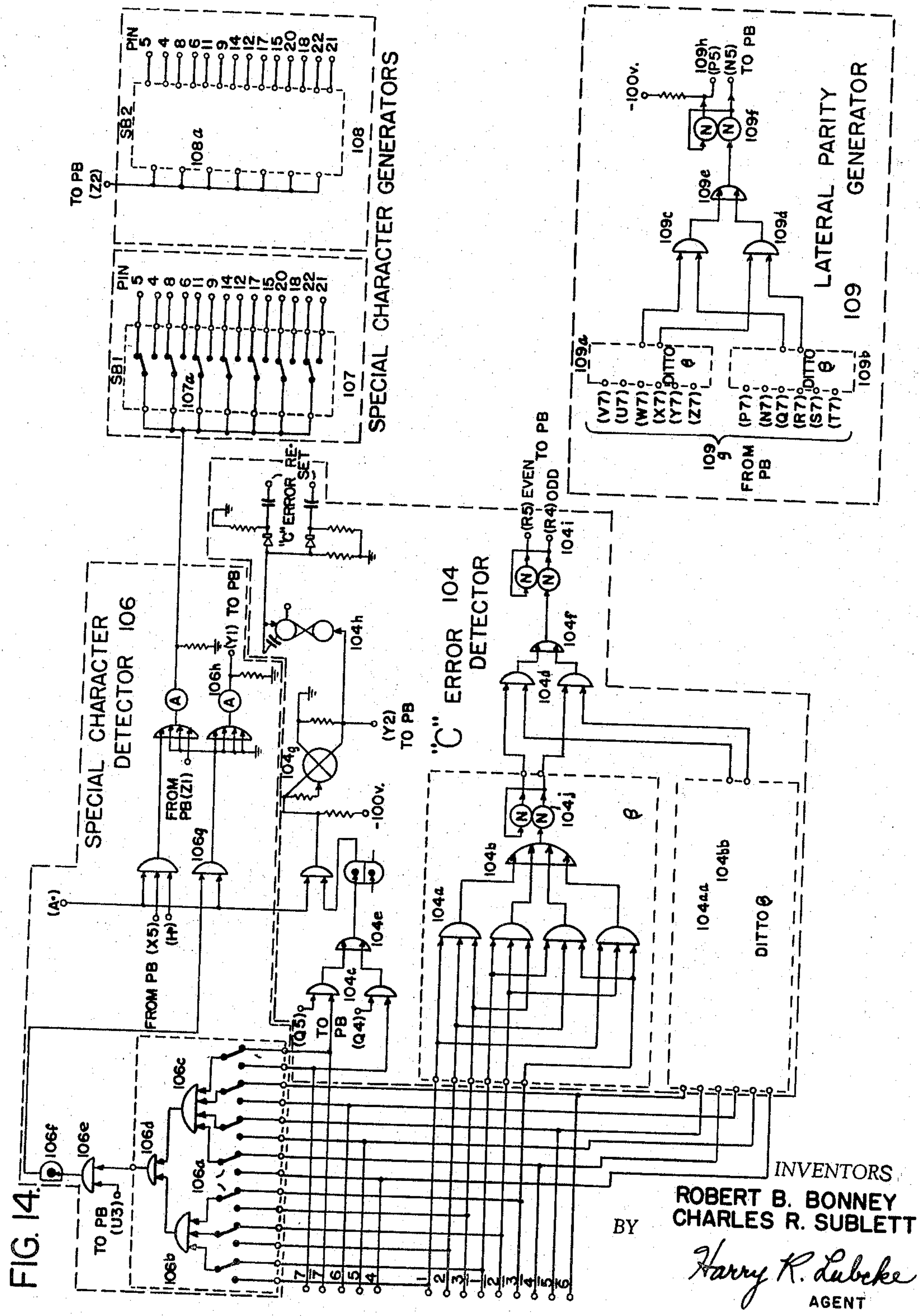

A specific embodiment of entity 91 is illustrated and described in the reference, "Arithmetic Operations in Digital Computers," by R. K. Richards, Van Nostrand, 1955, pp. 220–23. We prefer the embodiments of FIGS. 8–7(*b*) and characteristically employ a six bit input.

Load sync generator 92 consists of a flip-flop, delay unit and a pulse-mixer-amplifier. Load sync pulses are derived from three sources; the data clock signal previously mentioned, which is delayed a few microseconds, an end-of-word pulse, and an end-of-data pulse. The end-of-word pulse arises from input control entity 3 of FIG. 1 and enters data input entity 80 via conductor 88 in both FIGS. 2 and 3. The end-of-data pulse enters FIGS. 2 and 3 by previously identified conductor 12. Each of these "end" pulses operates an individual flip-flop in load sync generator 92 to provide the required outputs and control thereover.

Each of the three flip-flops in the load sync generator 92 may be of the type Y–101 of Catalog 856. The delay required is obtained by connecting a type Y–111 Delay Unit of Catalog 856 to the first of the flip-flops mentioned, which flip-flop is triggered from the "Data Clock 13" wire in FIG. 3. One cathode follower of a type Y–105 Multiple cathode follower of Catalog 856 connects to the output of the delay unit to provide an output in the same way that corresponding elements 198 and 199 are connected in FIG. 5 of the Patent 3,012,230, "Computer Format Control Buffer," by co-inventor C. R. Sublett.

Load sync pulses are derived from input data and are used to control the entry of input data into the translator. This function is also often referred to as an "input clock."

Special character generators 93 consist of two groups of seven single-pole double-throw switches. At one throw each switch is connected to −25 volts potential for a binary "1," while for the other throw each switch is connected to ground for a "0." A desired special end-of-word character is set into the first group of switches and a desired special end-of-data character is set into the second group of switches. The outputs from these special character generators 93 are applied to data mixing gates 94.

The data mixing gates 94 are composed of diode logic units consisting of three pairs of "and" logics followed by a four "or" logic for each unit; there being seven units. The circuits and interconnections of these logics may be supplied by four "and" and the one "or" of type Y–414 diode logics of Catalog 856. This is further illustrated at logics 77 and 81 of FIG. 4 of Patent 3,012,230. These are connected to the special character generators 93 with a single "or" connection to each from word converter 53 of FIG. 1. Through output cathode-followers the gated information over eight parallel data lines goes to memory auxiliary 83. The data mixing gates normally allow the input data to be gated through. When an end-of-word or end-of-data pulse occurs the resulting level shifts gate the respective special character to the mixing gates. An eighth parallel bit is added to each character by the mixing gates. This is a binary "0" in all "data" characters and a binary "1" in the special characters. This arrangement permits all combinations of seven bits to represent "data" characters. The data characters from the word converter are routed directly through associated "or" gates.

The term "data" characters is used here, as it is used elsewhere, to describe a unique code group which defines a number, alphabetic character, punctuation mark, or control code.

The load cycle control circuit 95 of FIG. 3 receives information from a number of the elements comprising data input entity 80 and exercises suitable control in consonance therewith. The circuit is set up for operation by depressing either "automatic" or "manual" pushbutton switches associated with either the "file convert" or the "block convert" mode of operation. When depressed, these switches supply −25 volts to respective dual "and" gates and to a four "or" gate. These gate connections are the equivalent of "and" gates 87 and "or" gate 90 in FIG. 4 of Patent 3,012,230.

Operation of the load cycle is started by depressing a "convert" push-button, which: (1) delivers a start signal through an "or" circuit and cathode-follower to the input transport control circuit, (2) delivers an "A" and "C" error reset signal, and (3) delivers a reset signal to make an "and" gate permissive, thereby allowing the next recycle command from data output assembly 85, FIG. 2, to pass through. The recited elements are, of course, interconnected to allow the electrical signals to progress from one circuit element to the next as stated.

At the end of each compressed block of input data, an end-of-compressed block signal is received from compressed block counter 82 and is: (1) passed through a three "and" logic to a stop mixer in start-stop mixing circuit 96, and (2) passed through a four "and" logic, a two "or" logic and a cathode-follower to start the unload cycle in data output assembly 85, FIG. 2. The recited elements are, of course, interconnected to allow the electrical signals to progress from one circuit element to the next as stated.

At the end of each compressed block of input data an end-of-compressed block signal is received from the compressed block counter 82. This is delayed a few hundred microseconds to allow the block counter time to stabilize and is: (1) passed through three terminal "and" logic to the stop mixer in start-stop mixing circuit 96, and (2) passed through the previously mentioned four "and" logic, two "or" logic and a cathode-follower to also start the unload cycle in data output assembly 85.

After the unload cycle is complete, a recycle command is received from the data output assembly 85. This is passed through a two "and" logic, is delayed of the order of 50 milliseconds and is then delivered to the start forward mixer of element 96, thereby starting a new load cycle. The recited elements are, of course, interconnected to allow the electrical signals to progress from one circuit element to the next as stated.

After a preset number of blocks or files of input data have been processed, the resulting signal from block counter 81 or file counter 82 is gated through a four group double "and" logic, a four "or" logic, and then; (1) delivered as the end-of-data pulse to the data input circuit, (2) passed through a cathode-follower, a four "and" logic, a two "or" logic and another cathode-follower to data output assembly 85 as the final start unload cycle command, and (3) passed through a four "or" logic to stop mixer 96 four "or" logic and to set a flip-flop which inhibits the subsequent recycle command from data output assembly 85. This same flip-flop also delivers a signal through a four "or" logic which energizes a conversion completed indicator.

The start-stop mixing circuit consists of a start forward mixer, a four "or" logic, start reverse mixer, a four "or" logic, stop mixer, a four "or" logic and two flip-flops. The three mixers receive start and stop signals from the various control circuits and trigger one flip-flop as a forward flip-flop and the other as a reverse flip-flop. These flip-flops in turn deliver control levels to input control unit 3, FIG. 1.

Input transport positioning circuit 97 is set up by depressing either the automatic or manual push-button switches associated with either the file position or the block position mode of operation. When depressed, these switches supply a potential of −25 volts through two successive four "or" logics and also to one side of four dual "and" gates, and through successive four "or," dual "and" and dual "and" logics.

Operation of the input transport positioning circuit is started when either forward or reverse push-button switches are depressed. These switches deliver start signals through the last mentioned dual "and" logics to start the four "or" forward mixer or to start the four "or" reverse mixer, respectively.

After a preset number of blocks or files have been passed over, the resulting signal from block counter 81 or file counter 82 is gated through the other side of the four "and" gates previously mentioned and passed through a four "or" logic to the four "or" stop mixer. In this manner the input transport is stopped at the desired location.

During the positioning cycle, the negative output from a four "or" logic is inverted by an inverting amplifier and then delivered to the memory auxiliary 83 as the position mode control to inhibit loading of data into the storage unit. During the processing of data the position mode control is permissive. When the input transport is stopped, the two previously mentioned flip-flops in this device produce outputs to a four "and" logic, which energizes a positioning completed indicator.

The circuits above-described by signal flow for conversion completed control, start, stop, these functions with respect to positioning control, are the equivalent of circuits in Patent 3,012,230 as described at col. 9, line 44, to col. 10, line 21.

In the error optional stop circuits 98 the "A," "B" and "C" error signals produce the following effects: (1) to cause a respective error neon lamp to glow, (2) to cause the error buzzer provided to sound unless a buzzer disable switch has been operated, and (3) to cause the conversion process to be stopped if the respective error optional stop switches are placed in the operate position.

The "A" error signal from "A" error detector 91 and the data input circuit triggers a flip-flop. This inhibits two four "and" gates and prevents a start unload signal from being delivered to data output assembly 85. The above-mentioned flip-flop also makes three "and" terminal logic permissive, thereby allowing the first subsequent end-of-compressed-block signal to pass through that logic. The resulting output therefrom is passed through a four "or" logic to a four "or" stop mixer and to another flip-flop. As a result, the input transport is stopped and the recycle command from data output assembly 85 is inhibited at a two "and" logic.

The "B" error signal from input control 3 produces a stop signal through a four "or" logic to stop mixer four "or" logic mentioned in the last paragraph, but only during an output tape parity check mode of operation.

The "C" error signal from data output assembly 85 is passed directly to the second flip-flop in the "A" error circuit, thereby inhibiting the recycle command at the last two "and" logic which is also in the "A" error circuit.

The "B" and "C" error control circuits operate in the same manner as the "A" error circuit described above. The "B" and the "C" error circuits can also be connected to different parts of our translator system by means of the internal program patchboard. In the normal operating mode, the "B" error circuit is associated with output devices and the "C" error circuit is connected to an internal error checking circuit within the translator which monitors the output data from the magnetic core memory 24 of FIG. 1.

In manual transport control 99, when input or output push-buttons associated with the transport control mode of operation are pressed a −25 volt potential is supplied to the respective input transport or output transport control gate, each being a four dual "and" logic. This term refers to a group of four associated 2-input "and" logic circuits. The respective transport is then controlled by depressing a forward, reverse, stop or rewind switch. These switches provide signals through the selected control gate to three flip-flops for the input transport and three more for the output transport. The outputs from these flip-flops are delivered to the respective input control 3 or output control 62.

The problem of manual transport control according to this invention is similar to that in Patent 3,012,230; thus, the detail of the circuitry is equivalent to that shown in FIG. 5 of that patent.

In test mode control circuit 100 an "operate-test" switch is provided. When this is in the operate position the two four "and" gates previously described in the "A" error circuit are permissive and a test mode inhibit control is delivered to memory auxiliary 83.

When the operate-test switch is placed in the test 1 position, the two gates mentioned in the preceding paragraph are inhibited. This inhibits the start-readout-cycle command and prevents the data characters which are stored in storage unit 84 from being unloaded by data output assembly 85. The stored characters are then read out one-by-one by depressing a manual read-out switch.

When the operate-test switch is placed in the test 2 position, the first above mentioned four "and" gate is permissive, thereby allowing the stored characters to be circulated through the word converter 53 (FIG. 1) and back into storage unit 84 (FIG. 2). The stored characters are again read out by depressing the manual memory read-out switch.

An output tape parity check circuit is included, largely in the error optional stop element 98. In the operation of the whole translator, after installing the output tape on the input tape transport an output tape parity check switch "forward" or ditto "reverse" is depressed. These switches supply a potential of −25 volts to dual "and" gates and through a dual "or" gate and cathode-follower to a "B" error four "and" gate.

The input tape transport is started in the direction selected by depressing the check switch, which delivers a start signal through the dual "and" gates mentioned above to either start the forward four "or" mixer or to start the reverse four "or" mixer. The "B" error detector is located in input control unit 3. If a "B" error occurs the error signal is passed by the "B" error four "and" gate mentioned above to the four "or" stop mixer also previously described.

A manual clear circuit is provided in load cycle control circuit element 95. A manual system clear switch is provided. When actuated a positive pulse of relatively long duration is applied to a "not" circuit and appropriate neon indicators. A positive pulse is produced by the "not" circuit and this opens a dual "and" gate to allow a 15 kc. clock signal from memory auxiliary 83 to trigger a blocking oscillator. The resulting chain of negative pulses from the blocking oscillator constitute a master reset signal which resets all circuits within the universal format control 8, with the exception of the compressed block and file counters 82 and block counter 81.

Reset pulses from elements 82 and 81 are applied to neon indicators. Resulting positive pulses are inverted by additional "not" circuits and then delivered as the reset signals to the respective counters. The neon indicators are thus used as dual "or" circuits in order to reset the counters by either the manual system clear pushbutton or by the reset push-buttons located on the respective counter assembly.

The above reset structure is the essential equivalent of the corresponding apparatus in Patent 3,012,230, as at col. 11, line 64, to col. 12, line 37; with the corresponding circuits shown largely in FIG. 5 of the patent.

A brief résumé of the data input and translator control entity 80, detailed in FIG. 3, is now given.

As shown in FIG. 3, entity 80 controls the input load cycle and also provides manual control of the input and output transports and the positioning control of the input transport.

The manual transport control circuit provides start, stop and rewind signals for forward or reverse operation of the input or output transports. These signals are delivered to input control unit 3 or to output control unit 62.

The input transport positioning circuit allows the input transport to be repositioned in either the forward or the reverse direction a preset number of blocks or files as determined by the values set into the respective block counter 81 or file counter 82. By actuating a manual control, a start signal is delivered through the start-stop mixing circuit 96 to the input control 3 via conductor 16. A stop signal is similarly delivered when the respective end-of-"N"-blocks or files signal is received from block counter 81 or file counter 82. During the positioning cycle the input transport positioning circuit delivers a "false" position-mode control level to memory auxiliary 83, thereby preventing data from being loaded into storage unit 84.

After the input transport is positioned as desired the data conversion cycle is started by a manual control. The load cycle control circuit 95 delivers a start signal through start-stop mixing circuit 96 to input control entity 3 and also a "true" convert-mode control level to the same.

The start signal to the input control entity starts the input transport. After the latter has come up to speed, the flow of data characters and data clock pulses to the input register is started. The data clock signal is also applied to load sync generator 92.

The data clock signal transfers the data from the input control entity to the input register. A few microseconds after each data clock signal is received the load sync generator delivers a load synchronizing pulse to memory auxiliary 83 and a sample pulse to the "A" error detector 91. If a lateral parity error exists in the data character in the input register the "A" detector delivers an error signal to the error optional stop circuit 98. An "A" error signal may also be used to insert the proper parity bit in the input register 90. The load synchronizing signal then transfers the data characters through memory auxiliary 83 to storage unit 84.

Special character generators 93 apply special characters to the data mixing gates and load synchronization pulses to load sync generator 92 when the respective end-of-word or end-of-data signals are received. The end-of-word signal is received from input control entity 3 via conductor 88 and the end-of-data signal is received from load cycle control circuit 95 at the end of each compressed block and also when "N"-blocks or files have been converted.

Data mixing gates 94 thus receive data characters from input register 90, special characters from special character generators 93 and data characters from word converter 53.

At the end of each compressed block of data characters the load cycle control circuit 95 delivers a stop signal to input control entity 3 and a start-unload-cycle signal to data output unit 62. After the unload cycle is complete the data output unit returns a recycle command to start another load cycle. After the preset number of blocks or files have been converted, operation of load cycle control circuit 95 is stopped.

The test mode control circuit 100 provides inhibit signals to various control circuits in order to allow one complete load cycle or word converter circulating cycle into storage unit 84, but to inhibit the unload cycle from the storage unit to output control unit 85. The data characters are then unloaded one at a time and each character is checked by observing the memory output register display indicators located on the data input and translator control assembly 80.

The memory auxiliary 83 of FIG. 2 is composed and functions as follows.

It contains pulse shaping and gating circuits to supply proper signals to storage unit 84 for the loading and unloading processes of the memory. A clock signal generator is also provided.

The load and unload synchronization pulses from data input and translator control 80, word converter 53 and data output assembly 85 are introduced through a pulse-mixer-amplifier having a four "or" logic. One circuit of a pulse mixer amplifier, type Y–112 of Catalog 856, supplies all of this circuitry. A terminal board is provided in the circuit to allow the load and unload synchronization signals to be processed by a coincidence detector circuit. Such is required when processing continuous input data. When this is not required the two circuits interrupted by the terminal board are jumpered through on it.

A first flip-flop and delay unit converts the negative load synchronizing pulses to positive pulses which are of a few microseconds in duration. A dual "and" gate is inhibited by the position-mode control level from the data input and translator control 80 during the positioning of the input transport. These elements are concerned with the function of elements 95–98, FIG. 5 of Patent 3,012,230. The unload synchronization pulses are shaped in a similar manner by a second flip-flop and delay unit. The output from the second delay unit is also delivered to the entity 80 as a reset pulse for the input register.

The data characters unloaded from storage unit 84 are applied to four dual level shift units. These alter the voltage levels as follows; (1) a binary "0" input level of zero volts is shifted to an output voltage of −30 volts, and (2) a binary "1" input level of −20 volts is shifted to an output voltage of plus 10 volts.

The data character unloaded from storage unit 84 are applied to four dual inverter amplifiers. Each group of level shift units and inverter amplifiers thus allows full use of the eight bit inputs of memory storage unit 84. The data bits at the output of the storage unit are represented by a positive pulse (binary "1") or a no-change in the ground potential of the output line (binary "0"). The inverter amplifiers invert the positive pulses and produce standard negative output pulses. The data characters appear at the output of the storage unit a few microseconds after each unload synchronization pulse is delivered to the storage unit.

Two circuits are provided for clearing, that is, resetting, storage unit 84. An electronic clear circuit is composed of a four "or" logic and amplifier, a flip-flop, a delay unit and a cathode-follower. A manual clear circuit is composed of a four "or" logic and amplifier, a differentiation unit, a one-shot and a relay. Certain available storage units are cleared utilizing the relay unit only, while others may be cleared by utilizing either or both circuits. This resetting circuitry is the equivalent to that of elements 208–13, FIG. 5 of Patent 3,012,230.

A clock generator, composed of a crystal oscillator operating at 120 kc. produces lower frequencies by the use of a "not" circuit and four flip-flops serially connected, The next-to-last flip-flop delivers a 30 kc. signal to a blocking oscillator and the last flip-flop a 15 kc. signal to a second blocking oscillator. These signals are delivered to a patchboard in data output assembly 85.

A clock generator is recognized as a known entity; witness the equivalent described in col. 11, lines 12–26, of Patent 3,012,230.

The preset word counter 86 of FIG. 2 contains a binary counter composed of ten flip-flops. The end-of-word pulses from data output assembly 85 are applied to the first of these. Thus, the outputs of the first flip-flop represent a decimal count of 0 or 1, those of the second a decimal count of 0 or 2, those of the third a decimal count of 3 or 4, and so on.

The detailed circuit diagram for the flip-flops and the switches is given as generic element 105 (elements 106–125) in FIG. 4 of Patent 3,012,230. In FIG. 2 herein, the "end-of-word" wire is the "0" input of FIG. 4 of the patent, while wire 67 herein is wire J of FIG. 4 of the patent.

The desired preset count is set into the preset word counter by positioning ten switches to the appropriate zero or decimal count-out value position. When the preset count is accumulated a ten multiple "and" gate produces an output through a cathode-follower and a delay unit to a blocking oscillator and an "or" gate. The resulting output from the blocking oscillator is the end-of-block pulse and this is delivered to data output assembly 85 and to output control unit 62. The output from the "or" gate is applied through a cathode-follower and resets the binary counter flip-flops. The master reset signal is also applied to the same "or" gate.

We turn now to a consideration of the data output assembly 85 of FIG. 2, which is detailed in FIG. 4.

The output register 103 is composed of seven flip-flops and seven corresponding pulse mixer amplifiers. The output register is reset by pulses from a reset for "or" mixer through a blocking oscillator. Alternate inputs to the output register are provided for either setting, resetting, or triggering the respective output register stages.

The detailed circuit of the output register is given as elements 185–191 in FIG. 6 and described at col. 11, lines 35–45, in Patent 3,012,230. Auxiliary set, reset, etc. elements are described at col. 11, line 64, to col. 12, line 5, in the patent. In FIG. 4 herein, wires "Data (8)" are wires P,' B,' A,' 8,' 4,' 2,' 1' in FIG. 6 of the patent. Herein, output "(8)" "P.B. 115" "Data" are wires 192 in FIG. 6 of the patent. Herein, "Reset" input is the equivalent of the wires from cathode followers 196 to flip-flops 185–91 in FIG. 6 of the patent.

The "C" error detector 104 is composed of elements associated with multiple "and" and "or" logics, a blocking oscillator and a flip-flop. This error detector is recognized as a known device; i.e., the register check logic 55, described at col. 5, lines 67–70 in Patent 3,012,230. If the number of binary "1" inputs to the logics is odd a binary "1" output appears at the first group of the said multiple logics at one terminal and a binary "0" at the other. The second group of multiple logics produces outputs in a similar manner. If the number of binary "1" inputs is even the output levels mentioned are reversed. If the number of binary "1" data bits in the first six flips-flops is odd a further logic produces a binary "1" output level. A simple patchboard is provided for an odd or even parity setup. When a parity error occurs the sample pulse is gated through a dual "and" logic to a blocking oscillator, which oscillator triggers an output flip-flop.

An end of data detector 105 is composed of seven single-pole double-throw switches, seven "and' 'logics, following successive dual "and" logics, a cathode-follower and a three "and" gate. The switches are placed in either one or the other position to select the desired character to be detected. When the end-of-data character appears in the output register the seven "and" logics and the dual "and" logics produce a negative-going output. This end-of-data signal is delivered to word converter 53 and is also gated through a three "and" logic by the sample pulse to the unload cycle control circuit. The end of the data detector herein is the equivalent of the end of file logic 48 of FIG. 3 in Patent 3,012,230. Circuit detail is given at col. 10, lines 6–21.

Special character detector 106 consists of seven single-pole double-throw switches, seven "and" logics, two following successive "and" logics and a cathode-follower. This circuit operates in a manner similar to that of the end-of-data detector circuit. The sample pulse gates the output of the seven "and" logics, a dual "and" logic and an amplifier to the patchboard previously mentioned. This pulse may be patched to a special character generator or used for other purposes. The special character detector 106 is the equivalent of the known recognize zero logic entity 24 of FIG. 2 and col. 3, lines 58–71, of Patent 3,012,230.

Special character generators 107 and 108 are essentially identical. Each consists of a switching unit having seven single-pole double-throw switches preceded by dual "and" logics and a cathode-follower. The characteristics and consequent interconnection of these elements are known. For example, the classical form of the logical "and" circuit is described on page 37 of the "High-Speed Computing Devices" reference book previously identified, with the circuit shown in FIGS. 4–1*a* thereof. Generator 107 is connected through a special character detector 106 to insert a special character at end-of-data by the insert-special-character pulse from the unload cycle control circuit. Both generators may be patched as required.

Lateral parity generator 109 consists of two multiple logic units, each having six input to four triple "and" logics, followed by one four "or" logic and two seriesed "not" amplifiers. These are cross connected by two dual "and" logics, followed by one dual "or" logic and two seriesed "not" amplifiers. This device is provided with patchboard input and output connections for connecting in the circuit of the data output assembly as required.

This device is a known entity 23, in FIGS. 2 and 3 of Patent 3,012,230, being briefly described at col. 3, lines 57–63; detailed as elements 77–92 in FIG. 4; and described in detail at col. 7, lines 6–39. In FIG. 4 herein, the P.B. 115 "(6)" input to lateral parity generator 109 corresponds to wires 71–76 and the output "Parity Bit," "P.B. 115," herein, corresponds to wire 93 in FIG. 4 of the Patent 3,012,230.

Ring counter 110 is composed of 13 flip-flops, an input and an output blocking oscillator and an output one-shot. The ring counter is triggered by the read-in clock, read-out clock, or unload clock signals introduced through an eight "or" logic and following amplifier and the input blocking oscillator. Twelve outputs from the ring counter are used as follows: (1) the outputs are delivered to the word converter control circuit 111 as address lines which are alternately read-in address and read-out address controls to word converter 53, (2) the number of outputs corresponding to the output word length are patched at the patchboard to inputs of the two pulse-mixer-amplifiers, each having eight "or" logics preceding the amplification, as load sync or read-out sync pulses, and (3) one of the outputs is patched to the end-of-word detector circuit as that pulse.

The ring counter is reset by the output patched to the end-of-word detector. This is delayed by the output one-shot and then triggers the output blocking oscillator.

A ring counter is a known entity; a description of which is to be found on page 23 and a schematic drawing for which is on page 24 (FIGS. 3–7) of the High-Speed Computing Devices" reference book previously identified. One "Address (12) Lines" of FIG. 4 herein is connected to one of the flip-flops of the reference book, with an appropriate input from an input line of FIG. 4 herein being connected to the "Pulse Input" bus of the FIGS. 3–7 of the reference book. Each flip-flop entity herein may be a Y-102 type according to Catalog 856.

The end-of-word detector circuit 112 consists of three dual "and" logics followed by four "or" logics and an amplifier to the output of ring counter 111, with four cathode-followers to give independent outputs for elsewhere; as to the output control unit 62 and word converter 53. Since the number of ring counts for the read-in, read-out, and unload or output cycle word length may differ, the end-of-word detector circuit provides the respective end-read-in, end-read-out, and end-of-word signals. These signals are gated by the read-in, read-out, and start write control levels.

The components comprising the unload cycle control circuit 114 are four groups of six dual "and" logics, each followed by a cathode-follower. The "and" logics are each connected to a different flip-flop of ring counter 110. The outputs go principally to the word converter 53 and to the patchboard.

The word converter control circuit 111 is composed of a three group dual "and" logic and interconnections to the four groups of "and" logics and the cathode-followers connected to each logic described in the preceding paragraph as the major part of the unload cycle control circuit 114. The dual input logics of circuit 111 gate the respective read-in or read-out clock signals to the ring counter 110 dual four "or" logic and amplifier, and also gate the read-in sync signal to memory auxiliary 83 through the same "or" logic group. In FIG. 4 it will be noted that the external connections between these circuits are suitably labelled to identify with the foregoing circuit descriptions.

Read-in address gates previously described as two of the four groups of six dual "and" logics are controlled by the read-in and the read-out control levels from word converter 53. The read-in address lines are connected directly to the word converter. The read-out address lines are routed through the patchboard to allow the selection of the order of read-out.

Patchboard 115 is shown fragmentarily throughout FIG. 4 in order to arrange the connections on that diagram most simply and clearly. In apparatus as actually embodied this patchboard is in one unit with 240 jacks thereon, with connections to all the jacks save 29 spares.

A brief resume of the data output assembly 85, detailed in FIG. 4, is now given.

The data output assembly performs two distinct transfer operations on the data characters. For a word converter (53) cycle, the data characters are transferred from memory storage unit 84 to the data output assembly 85 and therefrom back into the storage unit, and finally therefrom to the output control unit 62. For a direct processing cycle the data characters are transferred from the storage unit directly to the output control unit. The word converter cycle may be accomplished more than once for each block of data characters.

For operation in the word converter cycle, the start unload cycle signal from the data input and translator control 80 is delivered to the word converter 53 rather than to the data output assembly 85. As a result, the word converter delivers a "true" read-in level to the word converter control circuit 111 and the end-of-word detector circuit 112.

The term ' "true" read-in level' signifies a control level used to start the read-in cycle of the word converter 53 of FIG. 1. The word "true" defines the active state in this control circuit. This is in common with the words "true" and "false" used in descriptions of the operation of logic circuits. "True" indicates the operating condition and "false" indicates the non-operating condition.

When the "true" read-in level is received, the word converter control circuit 111 gates the read-in clock signal from the patchboard (located on the data output assembly 85) to the ring counter 110. The outputs from the twelve stages of the ring counter are connected as address lines to the word converter control circuit 111, and are also connected to the patchboard.

A selected number of the ring counter stages (the number selected corresponds to the number of characters per word to be delivered to the word converter) are patched to the unload cycle control circuit 114 and one stage of the ring counter is patched as the end-of-word signal to the end-of-word detector circuit 112.

The unload cycle control circuit 114 produces a chain of read-in synchronization signals from the ring counter outputs received. The read-in synchronization signals are delivered to the word converter control circuit 111 and to the word converter 53. The "true" read-in control level gates the read-in synchronization through the word converter control circuit as an unload sychronization to the memory auxiliary 83. The unload synchronization transfers the data characters from storage unit 84 into output register 103, and the read-in synchronization (delivered to the word converter) transfers the data characters from the output register 103 to the word converter.

Special character generators 107 and 108, special character detector 106, laterally parity generator 109 and "C" error detector 104 are patched as required.

The end-of-word signal from patchboard 115 (ring counter 110) is gated by end-of-word detector 112 as an end-of-read-in signal to the word converter 53, which then returns a "true" read-out level to word converter control circuit 111 and to the end-of-word detector.

The read-out cycle for the word converter is similar to the read-in cycle. The read-out clock from the patchboard is gated to the linear counter, the word converter control 111 delivers the read-out address, the unload cycle control circuit 114 delivers a read-out synchronization (to the word converter only) and at the end-of-word the end-of-word detector 112 delivers an end-read-out signal.

When the end-of-data character is detected in output register 103 the end-of-data detector 105 delivers the end-of-data signal to word converter 53 and the word converter then returns a start-unload-cycle signal to the unload cycle control circuit 114.

The direct processing cycle is started by the start-unload-cycle signal to the unload cycle control circuit 114 regardless of whether it arrives from data input and translator control 80 or from word converter 53.

When the start-unload-cycle signal is received, the unload cycle control circuit 114 delivers a start signal to output control unit 62. After the output transport is ready to accept data the output control unit returns a start write signal. This is applied to the unload cycle control circuit and to the end-of-word detector circuit.

The unload cycle control circuit 114 gates the unload clock signal from the memory auxiliary 83 to ring counter 110 and produces a chain of unload synchronization pulses from the resulting ring counter outputs. The unload synchronization pulses transfer the data characters from the memory storage unit 84 to output register 103.

The unloaded data characters appear in the output register a few microseconds after each unload synchronization pulse. Several more microseconds after each unload synchronization pulse the unload cycle control circuit delivers a sample pulse to the following circuits:

(1) to the end-of-data detector 105. If the end-of data character is permissive (patchboard control level) an end-of-data signal is delivered to the unload cycle control circuit 114.

(2) to the special character detector 106. The special character detector is also controlled by a patchboard connection and delivers an output pulse when a corresponding special character appears in the output register. This output is applied to the special character generator 107.

(3) to the special character generator 107. Special character generators 107 and 108 are used to insert special characters in the chain of output data characters as required.

(4) to the "C" error detector 104. The "C" error detector produces an output when a lateral parity error exists in the data character present in the output register 103, and is patched as required.

The unload cycle control circuit 114 delivers a reset signal to the output register 103 and a write synchronization signal to the output control unit 62 a number of microseconds after each unload synchronization pulse. The reset signal resets the output register while the write synchronization signal transfers the data characters from the output register to the output control unit.

The end-of-word signals from ring counter 110 (via the patchboard) are gated through the end-of-word detector 112 by the start write signal and delivered to the preset word counter 86. When the latter accumulates a preset count it delivers an end-of-block signal to unload cycle control circuit 114 and to output control unit 62.

When the output control unit 62 receives an end-of-block signal it returns a stop write signal for the duration of the output transport dynamic tape-gap (or card-gap) time. The stop write signal causes unload cycle control circuit 114 to stop the chain of unload synchronization pulses to memory auxiliary 83. After the dynamic tape-gap time the output control unit delivers a start write signal and the unload cycle is continued.

When the unload cycle control circuit 114 receives an end-of-data signal it delivers a recycle command to data data input and translator control 80 and to the output control unit 62; also an insert-special-character pulse to special character generator 107. A stop signal is delivered to the output control unit and the unload cycle is continued.

When the unload cycle control circuit 114 receives an end-of-data signal it delivers a recycle command to data input and translator control 80 and an insert-special-character pulse to special character generator 107. A stop signal is delivered to output control unit 62 and the unload cycle is completed.

The detailed construction of word converter 53 is given in FIG. 2. It is composed principally of an addressable auxiliary word memory 116 having a storage capacity sufficient for one word; i.e., seven bits per address on a twelve address capacity. This is, of course, a much smaller memory than that identified by reference numeral 84. Flip-flop 117 addresses memory 116 for either read-in or read-out operation. In position 1 the flip-flop allows data to be read into the memory. As preset word counter 86 scans it defines the sequential address positions. At the end of the read-in cycle the state of the flip-flop is reversed to position 2. In the first position twelve "and" gates in the "and" gate entity 118 are enabled and in the second position of the flip-flop twelve other "and" gates are enabled. When not enabled the respective groups of "and" gates are disabled. Thus, the data go in one path and out another, the second being patchable at address 119. In this way data may be fed into memory 116 in one sequence and extracted therefrom by a different sequence.

A typical re-ordering scheme involves writing a word with high-order digits first and low-order digits last. Another format requires that the word be constructed with low-order digits first and high-order digits last. In accomplishing such a conversion the first "and" gate in order in the read-out function is patched to the last memory 116 location. The second "and" read-out gate is patched to the next-to-last memory location, and so on.

Preset word counter 86 then scans and selects address locations in an inverted order and the data are reinserted in the main memory storage unit 84 by this scan.

In a similar manner, character converter 52 of FIG. 1 is composed of 64 six-input "and" gates, a patchboard, and 6 thirty-two-output "or" gates. By means of this converter any one of the 64 possible six-bit input code groups can be detected. The detected input code can be connected, through the patchboard, to the proper combination of output "or" gates to produce the desired output code. Thus, by means of this converter, any of the 64 possible input code combinations can be converted to 64 different arbitrarily selected output code combinations.

These word and character converters per se find their genesis in diode matrix structures. Such are illustrated and described in the reference, "Digital Computer Components and Circuits," by R. K. Richards, Van Nostrand, 1957, pp. 57–59. FIGS. 2–12B thereof show a binary coded input to decimal coded output. FIG. 2–13 is an example of the reverse of this process. Our embodiment, of course, employs six bits, for which Table 2–I of the reference gives data.

Matrix structures are further treated in the reference, "High Speed Computing Devices," by the staff of Engineering Research Associates, McGraw-Hill, 1950, pp. 42–43, where a binary to octal converter is shown in FIGS. 4–3*a* and an octal to binary converter in FIGS. 4–3*b*, corresponding to our decoding and recoding apparatus.

Figure 15:
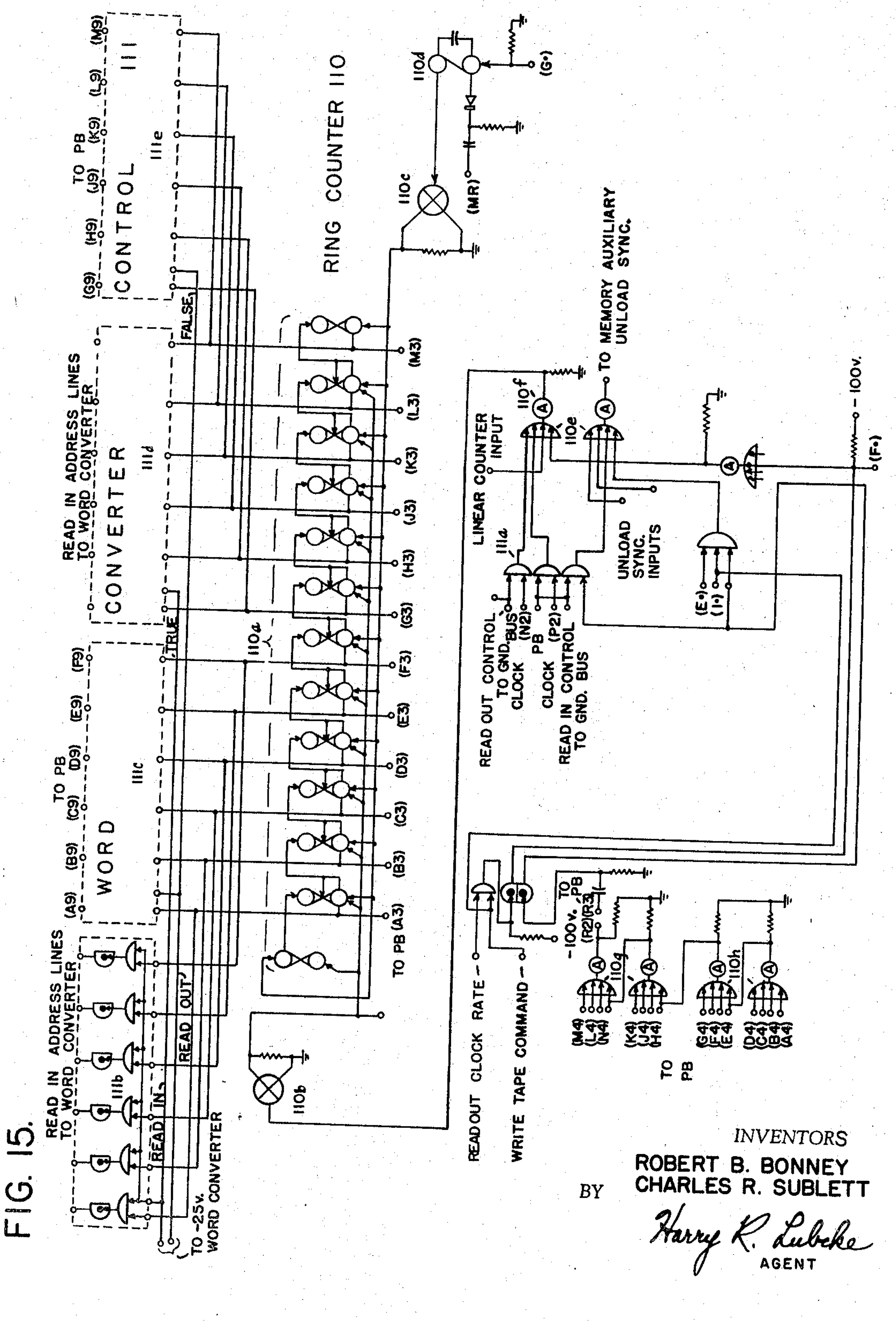
Figure 16:
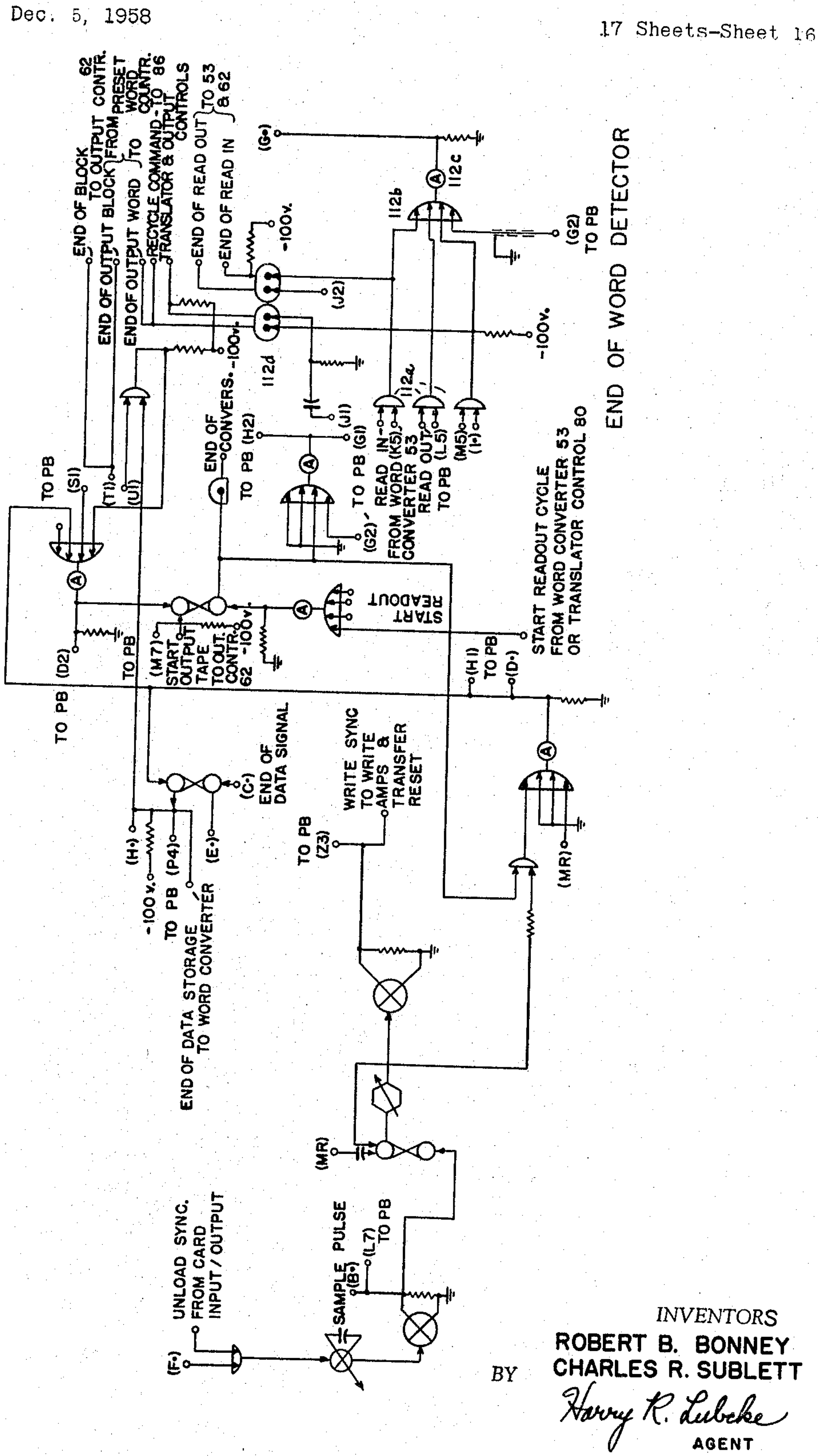
Figure 17:
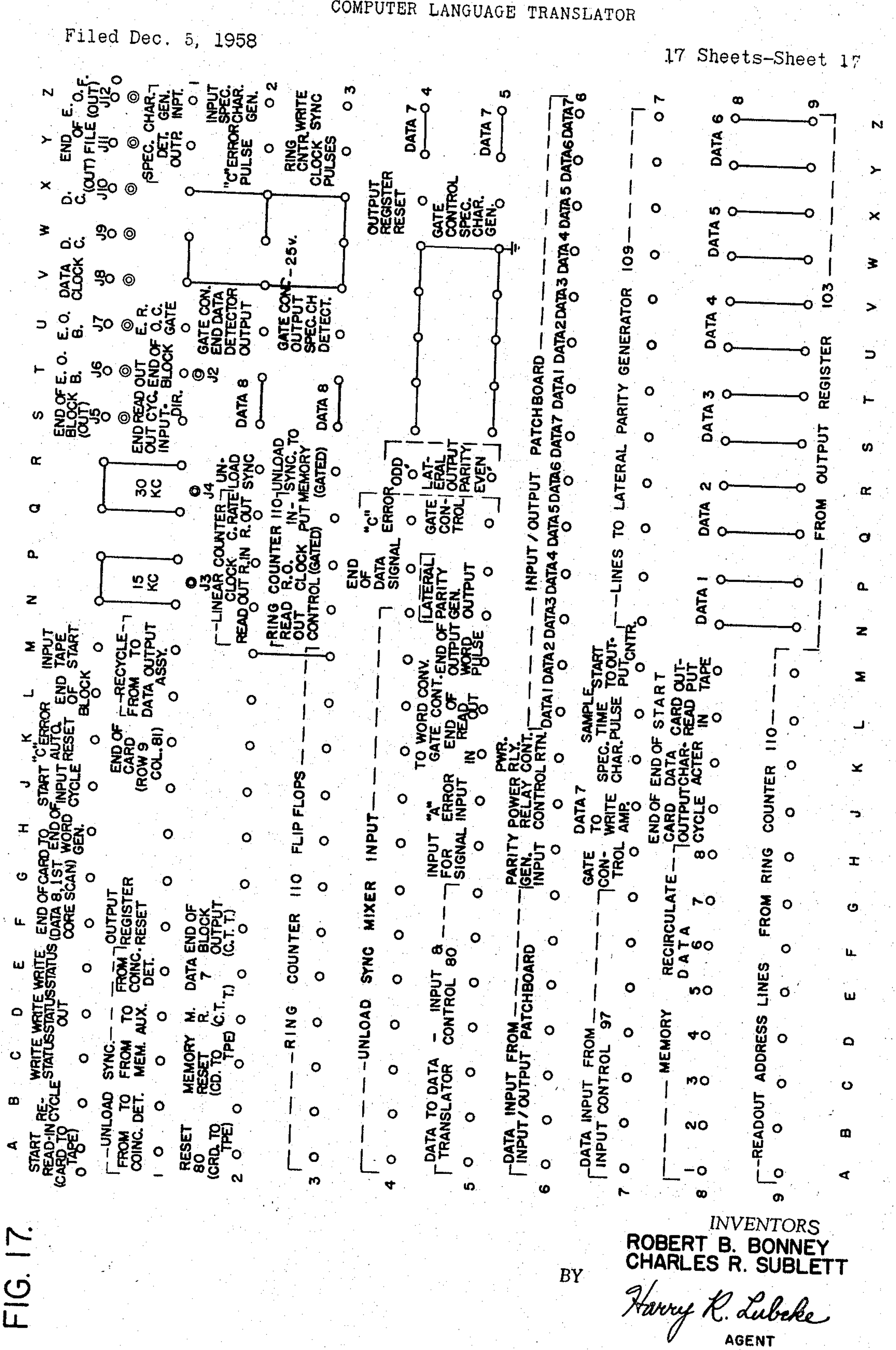

In this same reference, pp. 412–13, FIGS. 15–5, show a matrix for converting from decimal input to its equivalent binary coded decimal code corresponding to our recoding apparatus.

We now consider the over-all operation of our computer language translator.

The universal format control 8 operates in conjunction with the required input control 3, output control 62 and code converter units. Input control and output control units are always required for a complete translator system. Code converter units consist of the character converter 52 or word converter 53. When a simple code converter is used, as the character converter, the data may be processed "in-line." That is, the code conversion operation occurs serially in conjunction with other operations. With the word converter a recirculating cycle must be employed. That is, the input data are initially stored in memory storage unit 84, then circulated through the word converter, again stored in the storage unit with a revised format and finally unloaded into the output control unit 62. This is *not* processing "in-line."

When processing input data directly according to the "in-line" process, three types of operation are possible. These are: (1) each group of data characters stored into storage unit 84 is completely unloaded from the storage unit prior to storing the next group of characters; i.e., the load cycle is isolated from the unload cycle and the end of one cycle serves to start the other; (2) if the group of data characters to be stored exceeds the capacity of the storage unit the unload cycle is started prior to the end of the load cycle (each load cycle, however, is started by the end of the previous unload cycle), and (3) if the input data are applied continuously, the unload cycle is started each time a sufficient number of data characters have been stored.

Type (1) operation is regarded as the ordinary and simplest type of operation. Types (2) and (3) operation require additional control circuits in input control unit 3 and/or output control unit 62. These circuits include a load/unload coincidence detector to prevent simultaneous load and unload commands to the memory and a preset input data clock counter to establish the number of input data characters to be grouped into a single data output block.

With type (1) operation the load cycle of universal format control 8 is initiated by a start signal. This is delivered to the input control unit 3 from the data input and translator control 80, thereby starting the flow of data characters and data clock signals. Each data character may contain a maximum of seven bits, each bit being carried on one of seven parallel lines. A data bit is represented by either a negative level (binary "1") or no change in the ground potential of the input line (binary "0"). The data clock signal consists of a chain of negative pulses and gates the data characters into data input and translator control 80. A load sync is generated for each data clock pulse and loads the respective input data character through the memory auxiliary 83. The memory auxiliary alters the logic voltages for more practical storage and the character then enters the memory storage unit 84.

An end-of-word signal via conductor 88 from the input control unit 3 may be used to cause a special end-of-word character to be inserted into the chain of data characters loaded into the storage unit. This special character is either used as an identifying instruction within the universal format control 8 and eliminated at the output, or it may be processed as a part of the output data.

The compressed block counter, which is a part of element 82, produces an end-of-compressed-block signal after a preset number of end-of-block signals have been received from input control unit 3. The end-of-compressed-block signal is applied to the data input and translator control 80, which entity inserts a special end-of-data character into storage unit 84, delivers a stop signal to input control unit 3, and delivers a start-unload-cycle signal to data output assembly 85.

As a result, the data output assembly delivers a start signal to the output control unit 62, which starts the unload cycle from the storage unit. After the output transport is ready to accept data the output control unit returns a start-write signal to the data output assembly 85. This then gates back the unload clock signal from memory auxiliary 83 as the unload sync signal. This signal transfers the stored data characters from the storage unit through the memory auxiliary to the data output assembly.

After each character is transferred into the data output assembly a write sync signal is generated which transfers the respective data character from the data output assembly to the output control unit. Output block length is determined by the preset word counter 86. This is patched to count either the number of unload sync signals or the number of end-of-word signals from the output data assembly. The preset word counter delivers an end-of-block signal to output control unit 62 and to data output assembly 85 when the preset number of characters or words have been processed.

As a result, the output control unit returns a stop write signal for the duration of the dynamic tape-gap (or card-gap) of the output transport. During this period the chain of unload sync pulses is interrupted by the data output assembly. After the dynamic tape-gap time has elapsed the output control unit again delivers a start-write signal and another output block of data characters is transferred, thus continuing the unload cycle. If the contents of the storage unit are unloaded as a single block of characters the dynamic tape-gap cycle does not occur.

The unload cycle continues until the data output assembly 85 detects the special end-of-data character and as a result delivers a stop signal to the output control unit and a recycle command to data input and translator control 80 and output control unit 62.

The recycle command to the data input and translator control assembly starts the next input load cycle and the stop signal to the output control unit. The recycle command is employed as required.

When the word converter 53 is used the start-unload cycle signal from the data input and translator control 80 is delivered to the word converter instead of to the data output assembly 85. As a result, the word converter delivers a read-in signal to the data output assembly, which then transfers the data characters from the memory storage unit 84 to the data output assembly 85 and, word by word, into word converter 53. The read-in and read-out address lines determine the order in which the characters forming each word are transferred into and out of the word converter. The latter produces a load sync which transfers the converted words into the storage unit.

When the end-of-data character appears in the data output assembly 85 an end-of-data signal is delivered to the word converter. This then delivers a start-unload-cycle signal to the data output assembly 85. The converted data stored in the storage unit is then unloaded as before and transferred into the output control unit for subsequent recording on the output recording medium.

We now consider the use of the computer language translator in altering the format of digital data from that for one electronic computer to that for another.

These differences run the gamut from special character insertions or deletions through parity alterations to changes in the number of characters required to express a given amount of digital information. These may also include conversion of the digital coding of each input data word or character, insertion or deletion of special characters and alteration of the structure of a group of input data characters comprising a computer word.

An example of considerable alteration is that from the IBM format to the ElectroData format. In the former a character is composed of six bits having the designations "1, 2, 4, 8, B, A." In the latter the same information must be expressed as two characters composed of four bits and having the designations "1, 2, 4, 8."

A diode matrix is necessary for this conversion. In our translator this conversion is accomplished by circulating the IBM input data previously stored in the magnetic core memory 84 through word converter 53 and character converter 52 back into memory 84 by way of mixer 20 (of FIG. 1). In this transformation the word converter provides the proper number of characters to meet the ElectroData format and also translates the position of the data sign to the proper location for the ElectroData word. Character converter 52 is the diode matrix. It accepts input in the "1, 2, 4, 8, B, A" IBM single character coding and delivers at its output the corresponding two characters "1, 2, 4, 8" Electro-Data code.

In the above, the numerical and the alphabetic parts of the IBM code are employed for convenience in notation. The IBM code is divided into numeric and alphabetic parts; the numeric part being carried by the 1, 2, 4, 8 bits and the alphabetic part by the B, A bits. However, this is for convenience in notation, since the IBM code uses almost all, if not all, of the possible 64 combinations of a 6-bit code. Consequently, the code bits could have been numbered 1 through 6.

In the case of IBM 705 to Univac I conversion word converter 53 is also used together with the six-bit character converter 52, the details of which have been previously given.

In the IBM input data the sign is attached to the least significant digit, which occurs at the end of the computer word. The Univac I requires that the sign be a separate character at the beginning of the word. To accomplish this conversion the information is transferred out of memory storage unit 84 into word converter 53 one word at a time. Because of suitable patching of the word converter circuits the revised word is read out of the word converter in the proper order for the Univac I format.

The coding of the individual characters of the Univac I format is different from those of the IBM format. IBM numerical characters are in the 1, 2, 4, 8 binary coded decimal coding whereas Univac numerical characters are in 4, 5, 7, 11 excess-3 coding. Similarly, IBM and Univac alphabetic codings are radically different. Conversion from the IBM to Univac character codes is made by means of the 6-bit character converter 52 previously described.

Translation from IBM to Electro-Data or Univac I codes described above can be reversed by a more or less reciprocal interconnection of the system components and the use of the logic of the character converter 52 in an appropriate manner.

In the manner of these examples our computer language translator will accept data from any of the following presently known electronic digital computer records: IBM 650, 704, 705 or 709; EDPM; Univac I, Univac File; ElectroData 220; NCR 304; Philco Transac; RCA 501; Datamatic 1000; IBM punched cards; Collins TE206 Kineplex Receiver.

The output from our translator is suitable for any of the computers listed above, to and including the Datamatic 1000, but with the following devices thereafter: IBM 407 or 720 Line Printers; and Collins TE206 Kineplex Transmitter.

As illustrative of these conversions four examples follow.

The first is shown in FIG. 5 and gives the block diagram to change format when both the input and the output recording media are magnetic tapes.

In each of these specific examples the elements comprising our universal format control 8 of FIG. 1 are substantially the same. The major substitutions, reconnections or alterations of equipment take place in the input or output transport equipments or equivalent and in the input and output controls that are directly associated with such equipment.

Accordingly, in FIG. 5, tape transport units, such as the IBM 727, are found at 120 for the input and at 121 for the output devices. Input control 122 and output control 123 are constituted to control these tape transport units. The detailed examples of FIGS. 2, 3 and 4 imply tape to tape transport and so indicate the details of such a setup of our translator.

In operating our translator for tape to tape conversion the following steps are taken:

(1) The desired input and output setup is made by means of patchboards 115 (FIG. 4). A pre-wired program board is easily fabricated for each operating mode and the appropriate one is plugged into the 240 jackboard previously described.

(2) The input tape is positioned to the desired starting point by means of the block position or file position controls contained in the input transport positioning circuit 97, FIG. 3.

(3) The number of blocks or files to be converted is set into the block convert or file convert controls associated wtih entities 81 and 82, of FIG. 2.

(4) The start button is pressed and the following operation continues automatically.

(5) The input tape unit 120 is started.

(6) One or more blocks of data, to a maximum length that can be accommodated in the memory storage unit 84, as 1092 characters, are loaded thereinto. The input tape unit 120 is then temporarily stopped by element 96 in the universal format control 8, of FIG. 3.

(7) If conversion of character or word is not required, character converter 52 and/or word converter 53 are not utilized. If character conversion is required, this can be accomplished by connecting character converter 52 "in line" between input control 122 and data input translator control 80. If conversion (or "translation") of each word is required, word converter 53 is utilized and the information originally placed in memory storage unit 84 is recirculated through word converter 53 back into the memory in re-coded and re-ordered form as required at the output.

(8) The output tape unit 121 is started and the information that is stored in memory storage unit 84 is written onto the output tape. On completion of the output block the output tape is stopped temporarily and the next read-in cycle is started as described in paragraph 5 and those paragraphs following that paragraph.

(9) On completion of the last read-out cycle, as determined by the setting of block counter 81 or file counter 82, a light illuminates to indicate that the translation is complete.

In reciting the above steps various internal checks of our computer language translator have not been detailed. These include parity checks, parity generation, special character detection, and special character generation. The apparatus employed for accomplishing these functions and the mode of operation thereof have been previously given.

When magnetic tape to paper tape translation is required the processing is also as described in connection with FIG. 5. The only difference is that the data in the memory 84 are unloaded to the paper tape punch at a slower rate than for recording on magnetic tape in order to accommodate the capabilities of the paper tape punch mechanism. The unloading clock for this purpose can be generated within the computer language translator of our invention, or if the punch is of the free-running type this clock can be obtained directly therefrom.

The diagram of FIG. 5, with an obvious interchange of input and output transports and controls for the same, may be used for translating from punched paper tape to magnetic tape.

For translating from magnetic tape to punched cards with check of the card row parity following punching the arrangement of FIG. 6 is followed and the following steps are taken:

(1) The desired input and output setup is made by means of patch-boards 115 and pre-wired program boards, as has been described.

(2) The input tape is positioned to the desired starting point by means of input transport positioning circuit 97 of FIG. 3.

(3) The counters 81 and 82 are set to the desired positions and the start button is pressed. The operation then continues automatically according to the steps which follow.

(4) The input tape unit 125 is started.

(5) One block, corresponding to the data for one card, is entered into memory storage unit 84 and the input tape unit is stopped.

(6) During the time the card is in each row position of the punch the data in the memory are recirculated.

(7) Characters to be punched in each row are detected by the tape code to IBM card code converter. The operation of this converter is controlled by row emitter pulses received from the card punch in such a manner that the code converter will pass input codes corresponding to the row of the card which is under the punch, but will reject codes corresponding to other rows that have already been punched or are yet to be punched. In some instances, as in the case of ElectroData input, the tape code to card code conversion is made directly. In other cases it is expeditious to first convert the input data, as for example Univac I input data, to IBM tape code in the manner previously described prior to the start of the card punching cycle and then to use the IBM tape to IBM card code converter. It is thus possible to reduce the number of special tape code to IBM card code converter elements required to handle the inputs from a variety of different computer types.

(8) Output from the converter recommended in paragraph 7 above sets punch magnet control relays in punch output control 126. Synchronization of the proper column punch with the information in the memory storage unit 84 is maintained by column counter 127.

This column counter consists of an eighty-stage magnetic core linear counter. Pulses received from the column counter are connected to the corresponding punch control relay driver. The combination of the column pulse together with the output from the tape code to card code converter sets the magnet control relay and in turn the punch magnet in the IBM card punch machine. The column pulse alone will not cause the corresponding punch control relay to be set in the absence of output from the tape code to card code converter. Thus, the magnets in the card punch will be set to operate only on those columns which should be punched as determined by the output from the tape code to card code converter 130 of FIG. 6.

(9) Single-stage binary counters in the parity check circuit 128 count the punch commands for each row and store information defining whether the punch for a particular row is even or odd. This parity information is used during the checking cycle of step 12 below.

(10) On completion of the setup of the punch magnet relays the data for that row are punched into the card, using the internal timing signals generated by the card punch.

(11) During the time the previously punched card is in the reading station of the punch each row is scanned by means of card input control 129 and column counter 127.

(12) Detected punches are accumulated in the temporary parity storage register and compared to the row parity accumulated previously at the card parity check 128 during the punching operation. If an error is detected an error-stop command is delivered to the control circuits of universal format control 8; i.e., error optional stop 98 therein of FIG. 3.

(13) On completing the punching cycle the next input cycle is initiated and it is completed during the time a new card is entering the punch.

(14) Upon completion of the scheduled conversion, as determined by block counter 81 or file counter 82, the operation stops and a conversion-complete indicator light lights.

(15) Various editing manipulations may be carried out in this translation. These are detailed in connection with the description of FIG. 7, following. The reverse conditions here allow these changes to be made in the card punching operation.

If the parity checking operation is not necessary the card parity check 128 and card reader input control 129 are omitted.

The operation of our computer language translator for converting IBM cards to magnetic tape is illustrated in FIG. 7. An IBM reader employing two reading stations and row parity check for each card is assumed for the following description. A number of card reader types may be used; such as the IBM 514 reproducing punch, the 519 ditto, the IBM collator, the 89 ditto, the IBM 101 statistical machine and the IBM 407 accounting machine.

The operation is accomplished in the following steps:

(1) The desired input and output setup is made by means of patchboard 115 and pre-wind program boards as has been described.

(2) The start button is pressed and the operation continues automatically for the steps which follow.

(3) During the time each row of the card is under the brushes of the first reading station the entire eighty columns are scanned. This is accomplished by column counter 137 operating in conjunction with card input control unit 136. The latter is connected to the brushes of the first reading machine station. Detected punches are accumulated in a row parity register in card parity check 138. No data are entered into memory storage unit 84 from the first reading station. Synchronism between the card row position and the operation of the column counter is maintained by utilizing the row emitter pulses from the card reader.

(4) During the time each row of the card is under the brushes of the second reading station the eighty columns are again scanned by means of the column counter 137 in conjunction with duplicate card input control unit **136*a***. The latter is connected to the brushes of the second reading station.

(5) Punches detected during the second scanning are converted to IBM 705 tape code by means of code converter 139 and are entered into memory storage unit 84 of universal format control 8. The code converter is also synchronized to the row position of the card in the reader by means of the row emitter pulses from the reader.

(6) As each row is scanned in the second reading position the row parity is accumulated in a temporary register in card parity check 138. On completion of the scan for each row the row parity from the second reading is compared to the parity for that row determined during the first reading. If an error is detected a stop command is generated. If our translator has been set to operate in the automatic stop mode; i.e., error optional stop 98, the conversion operation is stopped until manually cleared by the operator.

(7) As each row is scanned at the second reading station the proper code is entered into the corresponding position of memory 84. To accomplish this information in the memory is recirculated for each card row and the information for each row is entered into the memory. For example, in recording a card containing punches in rows 11, 8, and 3 of a particular column, 2 and 1 would be entered into the memory during the 3 row time, 8 would be entered during the 8 row time and B would be entered during the 11 row time. The final code for that column position in the memory would then be B $\bar{A}$ 8 $\bar{4}$ 2 1.

(8) Upon completion of reading the entire card the output tape unit 63 is started and the information in memory storage unit 84 is written onto the output tape. Conversion from the IBM tape code to a different tape code would also be accomplished during the read-out cycle, using the six-level character converter 52 previously described.

In the case of ElectroData output tapes the conversion is made by recirculating the IBM 705 data in memory 83, 84 through an IBM 705 to EDC code converter; i.e., word converter 53, before initiating the output cycle. This is necessary because of the use of two character alpha-numeric coding in the ElectroData 220 computer. Similarly, a recirculation cycle through word converter 53 is performed for converting IBM cards to Univac tapes.

(9) The readout cycle is completed during the time a new card is entering the reader, and the output tape is then stopped.

(10) The conversion operation stops automatically after the last card is read and the last output recording cycle is complete. A suitable indicator light indicates this condition.

(11) Various editing manipulations may be performed in the card reading operations. These are listed below.

(11a) Column order can be rearranged to any desired arbitrary new order.

(11b) Blank columns may be added or deleted.

(11c) Data in any column or group of columns may be deleted.

(11d) Data in any column may be replaced by zeros.

(11e) Zeros to the left of significant digits in a field may be suppressed.

(11f) Two independent card formats may be prepatched into the program board used with patchboard 115. Either of the two formats may be selected by means of an external command, or by using control data directly from the punched cards.

(11g) It is also possible to handle the entry of column binary punched cards for use in scientific computer operations. Intermixed alpha-numeric and column binary cards may be handled by using control coding information from the cards. The latter information is discerned by special character detector 106.

Should the parity check operation not be required, the duplicate card reader input control **136*a* and card parity check 138** are eliminated in FIG. 7.

A power control panel and regulator power supplies are used to power our computer language translator. The former has appropriate relays to control the latter, of which latter plus 100 volt, minus 100 volt and plus 200 volt plate power supplies are provided. All power supplies are regulated and the current capability of each is of the order of one or two amperes. Since details of these elements are well known this information is not repeated here.

In the above manner we have brought simplification and universality to an inherently complicated and specialized family of processes.

Particular manufacturers' products and computers have been mentioned for sake of definiteness. However, we do not restrict ourselves thereto, but only to the general apparatus structure typified thereby.

For sake of brevity some format changing processes have been disclosed as proceeding in one way. It will be understood that by employing the same or related equipment in a reverse order the reverse process may be carried out. It will also be understood that other terminal apparatus may be employed; as analog to digital converters, manual keyboards, electric typewriters and plotters. Our apparatus accomplishes conversion of data. Terminal apparatus, with associated auxiliaries if required, either produces the data or utilizes it after conversion.

While not embracing the subject invention, patent application Ser. No. 686,946, filed Sept. 30, 1957, which issued as Patent No. 3,012,230 on Dec. 5, 1961, by present co-inventor Sublett and T. A. Galas entitled, "Computer Format Control Buffer," gives certain details of this class of apparatus and may be consulted in lieu of a nominal familiarity with the art. The connections shown therein constitute an illustrative embodiment of one specific set of interconnections of the apparatus herein.

The term "electronic" computer has been used herein. The generic sense is intended, including solid state transistor and diode devices, rather than only vacuum tubes functioning by means of electrons passing through evacuated space.

Still other modifications in the character of the circuit elements, details of circuit connections and alteration of the coactive relation between the elements may be taken without departing from the scope of our invention.

Having thus fully described our invention and the manner in which it is to be practiced, we claim:

1. In an alterable converting means for selectively converting any one of plural digital codes from one to the other independent of an electronic computer electrical apparatus comprising:

a first means to accept magnetically reproduced digital information in the form of electrical energy levels;

a static core matrix memory to store in excess of five words of digital information;

an electronic load element having plural logic and gating circuits to serially load said memory;

an electronic unload element having plural logic and gating circuits to serially unload said memory;

interconnecting means comprising a patchboard and any one of a plurality of prewired program boards connectable singly therewith, said patchboard having a plurality of terminals, wherein electrical connections coming into certain terminals of said patchboard proceed through the wiring of said program board and out through other of said terminals of said patchboard;

said first means, static core matrix memory, electronic load element, electronic unload element, logic and gating circuits of the load and unload elements connected respectively to said patchboard;

said interconnecting means connecting said first means output to said electronic load element input, said logic circuits and said gating circuits in said load element, said electronic load element output to said static matrix memory input, and said static matrix memory output to said electronic unload element input, and said logic circuits and said gating circuits in said unload element, for loading said memory in excess of five words according to one of said digital codes and to unload said memory according to another of said digital codes.

2. In a computer language translator for selectively translating any one of several digital formats from one to another independent of an electronic computer electrical apparatus comprising:

a first means to electrically represent incoming digital information;

a control entity having a static core memory to store digital information, plural electronic storage elements with logic and gating circuits to alter the format of said digital information, a special character generator to produce a prearranged digital character upon receiving a control signal signifying the occurrence of a predetermined status of data, loading means to load incoming and format altered digital information into said memory, unloading means to unload incoming and format altered digital information from said memory, and a special character detector to provide an output upon receiving a prearranged digital character;

interconnecting means comprising a patchboard and any one of a plurality of prewired program boards connectable singly therewith with each program board having electrical connections unique to one translation, said patchboard having a plurality of terminals wherein electrical connections coming into certain said terminals of said patchboard proceed through the wires and connections of said program board and out through other of said terminals of said patchboard;

said first means, said static core memory, said plural electronic storage elements, said logic and gating circuits, said special character generator, and said special character detector, connected respectively to said patchboard;

said interconnecting means connecting said first means output to said load means and said plural storage elements inputs, said logic and gating circuits in said load means input,
said load means output to said static core memory input,
said special character generator output to said storage elements inputs, said special character detector output to said unload means output, and said static core memory to said unload means input,
for translating from one digital format to another.

3. In a computer language translator handling incoming digital information for translating any one of a plurality of digital formats from one to another independent of an electronic computer, an electronic universal control entity comprising
a static magnetic memory to store digital information;
electronic elements including
load means with plural logic and gating circuits to load digital information into said memory,
unload means with plural logic and gating circuits to unload digital information from said memory according to said other format,
a parity check circuit to verify the correctness of digital data handling, and
a special character recognition circuit to provide an output upon receiving a particular digital character;
interconnecting means comprising a patchboard and any one of a plurality of prewired program boards connectable singly therewith with each program board having electrically conductive connections unique to one translation, said patchboard having a plurality of terminals wherein electrical connectors coming into said patchboard proceed through the wires and connections of said program board and then out said patchboard;
said static magnetic memory, load and unload means, logic and gating circuits, parity check circuit, and character recognition circuit connected respectively to said patchboard;
said interconnecting means connecting
said logic and gating circuits in said load and unload means respectively,
said load means output to said memory input,
said parity check circuit input to said unload means output,
said special character recognition circuit input to said unload means output, and
said unload means input to said memory output.

4. In a modifiable computer translator for altering electrically represented digital information independent of an electronic computer, in combination:
a first memory to store digital information;
a second memory to store digital information;
a plurality of static electronic entities including:
first means to introduce digital information as electrical pulse levels;
first load means to load said first memory;
first unload means to unload said first memory;
second load means to load said second memory; and
second unload means to unload said second memory;
coupling means comprising a patchboard and any one of a plurality of prewired program boards connectable singly therewith with each program board having electrical wiring unique to one translation, said patchboard having a plurality of terminals wherein electrical connections coming into said patchboard through certain said terminals proceed through the electrical wiring of said program board and out said patchboard through other of said terminals;
said first means, first and second load means, first and second unload means, connected respectively to said patchboard;

said coupling means connecting said first means output to said first load means input,
said first unload means output to said second load means input,
said first load means output to said first memory input,
said first memory output to said first unload means input,
said second load means output to said second memory input, and
said second unload means input to said second memory output to circulate said digital data through said first memory, through said second memory and again through said first memory for accomplishing conversion of the format of the input digital data to another format.

5. In an electronic computer language translator for altering incoming digital information to another digital format independent of an electronic computer the combination of a plurality of related translative elements for accomplishing format alteration comprising
a first means to introduce digital data as electrical pulses;
a first electronic means to control said first means connected thereto;
an input register means to receive the electrical pulses from said first means connected thereto;
a second electronic means to check input parity connected to said input register;
a main static magnetic memory to store digital information;
a third electronic means to load said incoming digital data from said input register into said memory;
a fourth electronic means to count groups of said incoming digital data and to provide control information based on said count;
a fifth electronic means to unload said digital data from said magnetic memory;
an auxiliary static word memory to store digital information;
a sixth electronic means to load said word memory;
a seventh electronic means to unload said word memory;
character-converting input logic means to alter the format of said incoming digital information; character-converting output logic means to alter the format of digital information which has been stored in said main static memory; an electronic output register to receive converted digital information;
interconnecting means comprising a patchboard and any one of a plurality of prewired program boards connectable singly therewith with each program board having electrical connections unique to one translation, said patchboard having a plurality of terminals wherein electrical connections coming into said patchboard through certain said terminals proceed through the electrical connections of said program board and out said patchboard through other of said terminals;
said third, fourth, fifth, sixth and seventh electronic means, said static magnetic memory, auxiliary word memory, character-converting input logic means, and character-converting output logic means connected respectively to said patchboard,
said interconnecting means connecting said third electronic means output to said sixth electronic means input,
said fourth electronic means output of said first electronic means input,
said fifth electronic means output to said sixth electronic means input,
said character-converting input logic output to said seventh electronic means input,
said seventh electronic means output to said third electronic means input, said character-converting input logic output to said third electronic means input, said third electronic means output to said static magnetic memory input, said static memory output to said fifth electronic means input, said character-converting output logic output to said fifth electronic means input, and said auxiliary memory input to said sixth electronic means output, the recited connections of said fifth, sixth, third and seventh electronic means providing a path for circulating digital data;

eighth electronic means to read at least twice circulated data from said magnetic memory to said output register connected thereto and to said fifth electronic means;

an electronic special character generator to insert predetermined special characters into said digital data of altered format connected to said output register;

and an electronic parity generator to verify the correctness of digital data handled connected to said output register thereby producing a particular language translation depending on the wiring and said electrical connections of the program board.

References Cited by the Examiner

UNITED STATES PATENTS

| | | | |
|---|---|---|---|
| 2,780,410 | 2/1957 | Breed et al. | 235—154 |
| 2,793,806 | 5/1957 | Lindesmith | 235—154 |
| 2,852,764 | 9/1958 | Frothingham | 235—154 X |
| 2,922,151 | 1/1960 | Reiling | 235—154 X |
| 2,930,028 | 3/1960 | Johnson et al. | 340—174 |
| 2,969,913 | 1/1961 | Cherin et al. | 235—157 |
| 3,000,556 | 9/1961 | Bewley et al. | 235—61.6 |
| 3,012,230 | 12/1961 | Galas et al. | 340—172.5 |

OTHER REFERENCES

High Speed Computing Devices, E.R.A. Inc., McGraw-Hill, 1960, chap. 14, pages 302–305.

MALCOLM A. MORRISON, *Primary Examiner.*

LEO SMILOW, CORNELIUS D. ANGEL, WALTER W. BURNS, ROBERT C. BAILEY, G. SADOWSKY, C. D. LUCAS, D. M. ROSEN, M. P. ALLEN, M. J. SPIVAK, *Assistant Examiners.*